(12) United States Patent
Moed et al.

(10) Patent No.: US 9,189,670 B2
(45) Date of Patent: Nov. 17, 2015

(54) SYSTEM AND METHOD FOR CAPTURING AND DETECTING SYMBOLOGY FEATURES AND PARAMETERS

(75) Inventors: Michael C. Moed, Hopkinton, MA (US); Mikhail Akopyan, Sudbury, MA (US)

(73) Assignee: Cognex Corporation, Natick, MA (US)

( * ) Notice: Subject to any disclaimer, the term of this patent is extended or adjusted under 35 U.S.C. 154(b) by 392 days.

(21) Appl. No.: 12/703,077

(22) Filed: Feb. 9, 2010

(65) Prior Publication Data

US 2010/0200660 A1    Aug. 12, 2010

Related U.S. Application Data

(60) Provisional application No. 61/151,715, filed on Feb. 11, 2009.

(51) Int. Cl.
*G06K 7/14* (2006.01)

(52) U.S. Cl.
CPC ........................................ *G06K 7/14* (2013.01)

(58) Field of Classification Search
CPC .. G06T 2200/28; G06T 1/00; G06K 9/00986; G06K 9/342; G06K 9/4638; G06K 7/10; G06K 7/14
See application file for complete search history.

(56) References Cited

U.S. PATENT DOCUMENTS 5,253,308 A    10/1993 Johnson
5,495,537 A    2/1996 Bedrosian et al.
(Continued)

FOREIGN PATENT DOCUMENTS

EP    1 182 604 A1    2/2002
EP    1 309 009 A2    5/2003
(Continued)

OTHER PUBLICATIONS

Forchheimer, et al., "Single-Chip Image Sensors With a Digital Processor Array", "Journal of VLSI Signal Processing", 1993, pp. 121-131, vol. 5, Publisher: Kluwer Academic Publishers, Published in: US.
Van Der Wal, et al., "The Acadia Vision Processor", "Computer Architectures for Machine Perception", Sep. 11, 2000, pp. 31-40, Publisher: IEEE Comput. Soc.
Kyo, et al., "An Integrated Memory Array Processor Architecture for Embedded Image Recognition Systems", "Computer Architecture", Jun. 4, 2005, pp. 134-145, Publisher: IEEE.
(Continued)

*Primary Examiner* — Sonji Johnson

(57) ABSTRACT

This invention provides a system and method for capturing, detecting and extracting features of an ID, such as a 1D barcode, that employs an efficient processing system based upon a CPU-controlled vision system on a chip (VSoC) architecture, which illustratively provides a linear array processor (LAP) constructed with a single instruction multiple data (SIMD) architecture in which each pixel of the rows of the pixel array are directed to individual processors in a similarly wide array. The pixel data are processed in a front end (FE) process that performs rough finding and tracking of regions of interest (ROIs) that potentially contain ID-like features. The ROI-finding process occurs in two parts so as to optimize the efficiency of the LAP in neighborhood operations—a row-processing step that occurs during image pixel readout from the pixel array and an image-processing step that occurs typically after readout occurs. The relative motion of the ID-containing ROI with respect to the pixel array is tracked and predicted. An optional back end (BE) process employs the predicted ROI to perform feature-extraction after image capture. The feature extraction derives candidate ID features that are verified by a verification step that confirms the ID, creates a refined ROI, angle of orientation and feature set. These are transmitted to a decoding processor or other device.

35 Claims, 16 Drawing Sheets

$$R = X*K00 + Y*K01 + DR$$
$$C = X*K10 + Y*K11 + DC$$

710

(56) References Cited

U.S. PATENT DOCUMENTS

| | | | |
|---|---|---|---|
| 5,524,068 | A | 6/1996 | Kacandes et al. |
| 5,588,435 | A | 12/1996 | Weng et al. |
| 5,692,210 | A | 11/1997 | Mita et al. |
| 5,698,833 | A | 12/1997 | Skinger |
| 5,835,141 | A | 11/1998 | Ackland et al. |
| 5,936,224 | A | 8/1999 | Shimizu et al. |
| 6,233,368 | B1 | 5/2001 | Badyal et al. |
| 6,240,208 | B1 | 5/2001 | Garakani et al. |
| 6,317,819 | B1 | 11/2001 | Morton |
| 6,411,734 | B1 | 6/2002 | Bachelder et al. |
| 6,585,159 | B1 | 7/2003 | Meier et al. |
| 6,617,565 | B2 | 9/2003 | Wu |
| 6,701,005 | B1 | 3/2004 | Nichani |
| 6,898,333 | B1 | 5/2005 | Gopalakrishnan et al. |
| 6,948,050 | B1 | 9/2005 | Gove et al. |
| 7,016,539 | B1 | 3/2006 | Silver et al. |
| 7,050,631 | B2 | 5/2006 | Bian et al. |
| 7,077,322 | B2 | 7/2006 | Miyazawa et al. |
| 7,085,432 | B2 | 8/2006 | Paquette |
| 7,088,845 | B2 | 8/2006 | Gu et al. |
| 7,205,522 | B2 | 4/2007 | Krymski |
| 7,209,173 | B2 | 4/2007 | Fossum |
| 7,237,721 | B2 | 7/2007 | Bilcu et al. |
| 7,271,835 | B2 | 9/2007 | Iizuka et al. |
| 7,319,423 | B2 | 1/2008 | Augusto et al. |
| 7,455,231 | B2 | 11/2008 | He |
| 7,519,239 | B2 | 4/2009 | Hepworth et al. |
| 7,637,430 | B2 | 12/2009 | Hawley |
| 8,295,360 | B1 * | 10/2012 | Lewis ................. 375/240.24 |
| 2001/0006191 | A1 | 7/2001 | Hecht et al. |
| 2002/0021835 | A1 | 2/2002 | Andreasson et al. |
| 2002/0084330 | A1 | 7/2002 | Chiu |
| 2003/0085336 | A1 | 5/2003 | Wu |
| 2004/0103093 | A1 | 5/2004 | Furuhashi et al. |
| 2004/0119844 | A1 | 6/2004 | Aldrich et al. |
| 2005/0041128 | A1 | 2/2005 | Baker |
| 2006/0012697 | A1 | 1/2006 | Boemler |
| 2006/0088218 | A1 * | 4/2006 | Tojo ............................ 382/199 |
| 2006/0186322 | A1 | 8/2006 | Matsuyama |
| 2007/0046799 | A1 | 3/2007 | Moholt |
| 2007/0076109 | A1 | 4/2007 | Krymski |
| 2007/0258007 | A1 | 11/2007 | Justiss et al. |
| 2007/0273785 | A1 | 11/2007 | Ogawa et al. |
| 2007/0285526 | A1 | 12/2007 | Mann et al. |
| 2008/0012696 | A1 | 1/2008 | Segura Gordillo et al. |
| 2008/0012969 | A1 | 1/2008 | Kasai et al. |
| 2008/0240571 | A1 | 10/2008 | Tian et al. |
| 2009/0022429 | A1 | 1/2009 | Longacre, Jr. et al. |
| 2009/0046953 | A1 | 2/2009 | Bink et al. |
| 2009/0052780 | A1 | 2/2009 | Kwon et al. |
| 2009/0072120 | A1 | 3/2009 | McGarry et al. |
| 2009/0141987 | A1 | 6/2009 | McGarry et al. |
| 2009/0202149 | A1 | 8/2009 | Doi et al. |
| 2009/0212112 | A1 | 8/2009 | Li et al. |
| 2009/0238478 | A1 | 9/2009 | Banno |
| 2010/0037024 | A1 | 2/2010 | Brewer et al. |
| 2010/0118161 | A1 | 5/2010 | Tsurumi |
| 2011/0211726 | A1 * | 9/2011 | Moed et al. .................. 382/100 |

FOREIGN PATENT DOCUMENTS

| | | |
|---|---|---|
| EP | 1580814 | 9/2005 |
| GB | 2421137 | 6/2006 |
| JP | 2003023573 | 1/2003 |
| JP | 2005286799 | 10/2005 |
| WO | WO-2005106786 | 11/2005 |
| WO | WO-2007116352 | 10/2007 |

OTHER PUBLICATIONS

Li, et al., "A Window-Based Bar Code Acquisition System", "Document Recognition", Feb. 9, 2004, pp. 125-132, vol. 2181, Publisher: SPIE, Published in: US.

Broggi, et al., "Enhancement of a 2D Array Processor for an Efficient Implementation of Visual Perception Tasks", *Proc. Computer Architectures for Machine Perception*, Dec. 15, 1993, pp. 172-178, Publisher: IEEE, Published in: IT.

Broggi, et al., "The Paprica Massively Parallel Processor", *First International Conference on*, May 2, 1994, pp. 16-30, Publisher: IEEE, Published in: US.

Cat, et al., "SIMPiL: An OE Integrated SIMD Architecture for Focal Plane Processing Applications", *IEEE Xplore*, pp. 44-52, Publisher: IEEE, (1996).

Chintalapudi, "Localized Edge Detection in Sensor Fields", Publisher: University of Southern California, (2003).

Forchheimer, R. et al., "Single-Chip Image Sensors with a Digital Processor Array", *Journal of VLSI Signal Processing*, 5, Kluwer Academic publishers, Boston (1993), pp. 121-131.

Gregoretti, et al., "The Paprica SIMD Array: Critical Reviews and Perspectives", *International Conference on*, Oct. 25, 1993, pp. 309-319, Publisher: IEEE, Published in: IT.

Iannizzotto, et al., "An Edge-Based Segmentation Technique for 2D Still-Image With Cellular Neural Networks", *IEEE Xplore*, vol. 1, Publisher: IEEE, (2005), pp. 211-218.

Ishikawa Oku Laboratory, "Highspeed Vision with Massively Parallel Copressors", *Parallel Processing for Sensory Information—2001-2006 IEEE*, (2001).

Ishikawa Oku Laboratory, "Image-Moment Sensor", *Parallel Processing For Sensory Information, Ishikawa Oku Laboratory, Department of Information Physics and Computing.*, (2008).

Ishikawa Oku Laboratory, "Processor for High-speed Moment-based Analysis of Numerous Objects", *Parallel Processing for Sensory Information*, 2001-2006 IEEE, Ishikawa Oku Laboratory, Department of Information Physics and Computing, (2001).

Ishikawa Oku Laboratory, "Real-time Shape Measurement of Moving/Deforming Object", *Parallel Processing for Sensory Information*, 2001-2006 IEEE, Ishikawa Oku Laboratory, Department of Information Physics and Computing, (2001).

Ishikawa Oku Laboratory, "Vision Chip", *Parallel Processing for Sensory Information, Ishikawa Oku Laboratory, Department of Information Physics and Computing*, (2008).

Karande, et al., "Independent Component Analysis of Edge Information for Face Recognition", *International Journal of Image Processing*, vol. 3, No. 3, pp. 120-130 (Jun. 2009).

Miyazak, "Image Processing System Having Extended Area of Interest Circuitry", *IBM Technical Disclosure Bulletin*: Publisher IBM, (Mar. 1993), pp. 447-450.

Rehse, "Edge Information: A Confidence Based Algorithm Emphasizing Continuous Curves", *Lecture Notes in Computer Science* vol. 1112, 1996, pp. 851-856.

Rhee, et al., "Boundary Extraction of Moving Objects From Image Sequence", *1999 IEEE TENCON*, (1999), 621-624.

Rosas, et al., "SIMD Architecture for Image Segmentation Using Sobel Operators Implemented in FPGA Technology", *2nd International Conference on Electrical and Electronics Engineering* Publisher: IEEE (Sep. 7, 2009), pp. 77-80.

Sappa, et al., "Improving a Genetic Algorithm Segmentation by Means of a Fast Edge Detection Technique", *IEEE Xplore*, pp. 754-757 (2001).

Watanabe, "955-fps Real-time Shape Measurement of a Moving/Deforming Object using High-Speed Vision for Numerous-point Analysis", *2007 IEEE International Conference on Robotics and Automation*, Roma, Italy, (2007).

\* cited by examiner

R = X*K00 + Y*K01 + DR

C = X*K10 + Y*K11 + DC

710

SYSTEM AND METHOD FOR CAPTURING AND DETECTING SYMBOLOGY FEATURES AND PARAMETERS

RELATED APPLICATION

This application claims the benefit of U.S. Provisional Application Ser. No. 61/151,715, filed Feb. 11, 2009, entitled SYSTEM AND METHOD FOR CAPTURING AND DETECTING SYMBOLOGY FEATURES AND PARAMETERS, the entire disclosure of which is herein incorporated by reference.

FIELD OF THE INVENTION

This invention relates to symbology readers, and more particularly to systems for capturing and identifying symbology, such as one-dimensional (1D) barcodes.

BACKGROUND OF THE INVENTION

Machine vision systems use image acquisition devices that include camera sensors to deliver information related to a viewed subject. The system then interprets this information according to a variety of algorithms to perform a programmed decision-making and/or identification function.

Generally, symbology (also termed "ID") reading entails the aiming of an image acquisition sensor (CMOS camera, CCD, etc.) at a location on an object that contains a symbol (a "barcode"), and acquiring an image of that symbol. The symbol contains a set of predetermined patterns that represent an ordered group of characters or shapes from which an attached data processor (for example, a microcomputer) can derive useful information about the object (e.g. its serial number, type, model, price, etc.). Symbols/barcodes are available in a variety of shapes and sizes. One of the most commonly employed symbol types used in marking and identifying objects are the so-called one-dimensional or "linear" barcode, one common for of which comprises a series of vertical stripes of varying width and spacing. While an image sensor that acquires pixels representative of the scene containing the barcode is described generally herein, other techniques and device for acquiring barcode information, including well-known laser scanners have also been used to acquire barcode information.

By way of background FIG. 1 shows an exemplary scanning system 100 adapted for handheld operation. An exemplary handheld scanning appliance in the form of a handpiece 102 is provided. It includes a grip section 104 and a body section 106. An image formation and processing system 151, shown in phantom, can be controlled and can direct image data to an onboard embedded processor and associated memory 109 that controls illumination image capture and other system processes. This processor 109 can also include, or be operatively connected to, an ID decoding application or sub-processor 113 by image data is interpreted into usable information (for example, alphanumeric strings derived from the symbols (such as the depicted one-dimensional (1D) barcode image 195) placed on the surface of an object. The decoded information can be directed via a cable 111 or wireless link to a PC or other data storage device 112 having (for example) a display 114, keyboard 116 and mouse 118, where it can be stored and further manipulated using an appropriate application 121. The application 121 can also include various interface components that allow the embedded processor 109 to be programmed with appropriate vision tools 130 needed for the particular ID identification and decoding task. In addition, the interface application can be used to diagnose scanner problems and/or determine other status items with respect to the scanner. A USB (2.0) or wireless interface allows for temporary connection of the scanning appliance 102 with respect to the PC 112. The precise arrangement of the handheld scanning appliance with respect to its embedded processor, ID decoding application, computer interface and/or other processors and processes is highly variable.

The scanning process can be adapted to respond to inputs from the scanning appliance 102. For example, when the operator toggles a trigger 122 on the hand held scanning appliance 102, an internal camera image sensor (within the image formation system 151) captures an image of a field of view 131 on an object 105. Within the field of view resides an exemplary region of interest (ROI), which includes the exemplary one-dimensional (1D) symbol 195 that can be used to identify the nature and quality of the underlying object 105. One or more visual indicators 141 on the scanning appliance 102 can be illuminated or otherwise addressed (e.g. an LCD alphanumeric display) by signals from the processor 109 to indicate a successful read and decode of the symbol 195. Audible indicators can also be activated to denote associated events.

One desirable feature for a scanning appliance is the ability to self-trigger the scanning process when an ID (i.e. symbol 195) is detected within the ROI. Image-based (i.e. employing an image sensor and vision system) symbology/ID scanners generally require a trigger to indicate when an ID (barcode) is in the field of view in order to begin the ID-finding and decoding process. Likewise, the ID finding process can be part of the trigger. That is, the trigger occurs in response to the finding of an ID within the field of view of the scanner. For many applications, it may be difficult to provide such a trigger because (a) it may not be known by an outside source (i.e. the potential trigger generator) when the barcode is in the field of view (b) it may be impossible to generate a reliable trigger given the mechanics of the operation. The difficulty increases when the barcode moves in a fashion that is not completely controlled in motion, position, and/or direction relative to the imaging system. More, generally, the number of image-capture and image-decoding events per second inherent to the system limits the ability to adequately scan an ID. Thus, rapid movement of the scanning appliance, and/or orienting the appliance at a steep angle with respect to the ID, can render most or all of the limited number of capture events inadequate to detect or decode the ID.

Moreover, it is recognized that certain aspects of the code itself can make it difficult to detect or decode it within a limited number of capture events—and a moving scanner typically results in a more limited group of usable image-captures. In particular, certain codes that have low contrast (e.g. printing on a brown cardboard box) may require the imaging system to perform adjustments to capture settings (such as gain or exposure) during the capture process. In such cases, the initial capture settings may be inadequate and there may be latency until the final, more-sufficient capture settings are adjusted. The number of captures available after this initial capture and adjustment latency may be quite small and make the detection and/or decoding of an ID difficult.

Alternatively, a user can employ a laser scanner to enable self-triggering and overcoming some motion in the barcode relative to the scanning device. However, laser scanners employ mechanical parts, such as moving mirrors that may become a maintenance burden. In addition, laser scanners perform more poorly than image-based ID scanners for difficult-to-read codes due to poor contrast, damage to the code print, etc.

Another alternative scanning approach is to employ a line-scan camera-based scanning appliance to capture images of the ID on an underlying object. Using line-camera, the entire field of view is continually imaged and processed, searching for ID-like features within the field off view and processing these features as they are detected. However, a disadvantage of line scan cameras is that they typically require careful control of the line scan rate, rendering them difficult or impossible to use in situations where the motion between the ID and the camera cannot be reliably or accurately measured and/or controlled.

A variety of currently available scanning appliances employ a digital signal processor (DSP) to accomplish the various functions needed to detect and decode an ID. Such DSPs, thus, include the vision system elements along with a conventional or customized ID-decoding application or process. This tends to limit processing speed as image pixels are captured, compared in neighborhood operations for appropriate regions of interest containing ID-like features, such features are extracted and then acted upon by the decoder in a step-by-step manner. When the ID and scanning appliance pixel array are moving relatively quickly with respect to each other—for example as a user rapidly passes the scanner over the ID, the capture rate of conventional image sensors/pixel arrays (often no greater than about 60 frames per second), combined with the processing throughput of conventional DSPs, is often insufficient to provide enough readable frames to decode the ID. Even given 60 frames per second, only a fraction of those frames will capture the complete ID, and several of those frames may be utilized exclusively to change the pixel array's imaging parameters (for lighting and contrast change, etc.), thus rendering them unusable for the decoding process. Hence, the final number of usable images for decoding can quickly approach zero in a conventional implementation.

It is, therefore, desirable to provide a system and method for capturing, detecting and identifying symbology/ID features, which allows for a wide range of rate motion and uncontrolled position/direction of the scanning appliance with respect to the object and associated ID (such as a 1D barcode). This system and method should enable the scanning appliance's imaging system to operate for tasks that were previously challenging or unachievable, such as those involving barcode reading in point-of-sale swipe scan systems. In addition it is desirable to provide a system and method that effectively reduces or eliminates the need for a trigger in an image-based scanning appliance, thereby allowing the scanner's imaging system to compete with laser scanners in environments where a trigger is difficult or impossible to configure. More generally, the system and method should facilitate a higher number of image capture and read events per second so as to increase the likelihood of one or more successful decoding events.

SUMMARY OF THE INVENTION

This invention overcomes the disadvantages of the prior art by providing a system and method for capturing, detecting and extracting features of a symbology or ID, such as a 1D barcode, that employs an efficient processing system based upon a vision system on a chip (VSoC) architecture. Under the control of a CPU (also termed a "general purpose processor" herein), the VSoC illustratively provides a linear array processor (LAP) that is constructed with a single instruction multiple data (SIMD) architecture in which each pixel of the rows of the pixel array are directed to individual processors in a similarly wide array that defines the LAP. The pixel data are processed according to a front end (FE) process that performs rough finding and tracking of regions of interest (ROIs) that potentially contain ID-like features. The ROI-finding process occurs in two parts so as to optimize the efficiency of the LAP in neighborhood operations—a row-processing step that occurs during image pixel readout from the pixel array and an image-processing step that occurs typically after readout occurs. The relative motion of the ID-containing ROI with respect to the pixel array is tracked and predicted. Illustratively, the memory, the SIMD processor arrangement and the general-purpose processor (CPU) are provided on a common chip/die. The pixel array is optionally also provided on the chip/die so as to provide an illustrative VSoC architecture. Alternatively, the pixel array can be provided on a separate chip/die and operatively connected with the die containing the memory and processing functions.

In an embodiment, an optional back end (BE) process employs the predicted ROI to perform feature-extraction after image capture. The feature extraction derives candidate ID features that are verified by a verification step that confirms the presence of the ID symbol, creates a refined ROI, angle of feature orientation and the feature set itself, typically reduced to a smaller binary image form than the original captured grayscale pixel image. These, along with the ROI data, are transmitted to a decoding processor or other device. Alternatively, the features are transmitted to the decoding processor in advance of verification to be decoded on the fly, and subsequent verification determines whether the decoding results are retained by the decoder as a proper ID. In a further alternative, the image stream can also be transmitted to the DSP.

In another embodiment, the ROI result of the FE process is directly transmitted (free of a VSoC BE process) to an off-chip, back-end processing device, such as an image-decoding DSP. The ROI result in this embodiment can include the ROI position, size and orientation. This is used along with a raw, reduced size (a region of the overall image), or compressed image data stream to perform ID detection and decoding by the DSP.

In still another embodiment, upon finding an ID ROI, or another form of ID-candidate indicia data (via operations of the LAP or a another large-scale-data-handling VSoC process), a notification (trigger) is transmitted to the decoding DSP to initiate an ID search and decoding operation within a transmitted stream of raw or compressed image data associated with the trigger event.

Where the VSoC and the process are used as a trigger, decoding devices and processes can alternatively receive an image stream for decoding from another pixel array source (that can be another VSoC having a different resolution than the trigger VSoC array). In this implementation, the trigger VSoC is a peripheral of an overall vision system.

In an illustrative embodiment, the row-processing step provides a rolling buffer of N rows that allows extraction of candidate ID edge positions, magnitudes and rotational orientations through neighborhood operations and binning of edges subsequent to extraction into predetermined rotational orientations. The bins are combined to define regions in the image-processing step having similarly oriented edges. The resulting image is cleaned and a vision tool, such as a blob analysis tool, is used to determine possible ID ROIs. The ROI finding process is repeated until a predicted ROI motion track can be derived. Then, the optional BE process occurs using the predicted ROI.

In an illustrative embodiment, the verification process employs stripes or scan lines to define histograms through extracted features, where histograms exhibit large peaks at 180-degree separation, the stripes show a positive ID result. If the number of positive-ID stripes exceeds a threshold, then verified ID is present and decoding can occur. In a further illustrative embodiment, data transmitted to the decoding device or processor can be compressed. Likewise, a wide shift register can be employed to receive feature data from the image data memory and thereafter pass the feature data through a port to the decoding device/processor while freeing the LAP and CPU to operate on other tasks.

BRIEF DESCRIPTION OF THE DRAWINGS

The invention description below refers to the accompanying drawings, of which.

DETAILED DESCRIPTION

The system and method for capturing, detecting, identifying and extracting ID/barcode features according to illustrative embodiments is adapted to operate with a processor that defines an architecture capable of processing an entire row of data read-out from an interconnected pixel array in a discrete processing cycle (i.e. all data in a row being simultaneously processed with each clock cycle). To accomplish this, the overall VSoC processor is organized to include a wide on-bit data bus (for example a 1024×1 bus) between an image data storage memory (also having a storage array that is 1024 wide) and the pixel array (in this example, a 1024×768 pixel array with 8-bit or 6-bit pixels). This memory is interconnected by another similarly wide (1024×1, for example) bus to the image processing component, which is organized to process the entire row simultaneously using, for example, single-instruction, multiple-data (SIMD) processors that are very efficient at neighborhood operations. Accordingly, each of the processors can interoperate with others that are processing neighboring data within a row. Combined, these processors are termed the Linear Array Processor (LAP). In an illustrative embodiment these processors each operate at 90 MHz. They are configured to act as one-bit arithmetic logic units (ALUs) on the entire row of data (1024 elements) simultaneously. In the illustrative embodiment, the processors in the LAP are further adapted to allow data to be moved between processors up to 13 columns away to facilitate wide and efficient neighborhood operations. The illustrative processing rate yields a throughput of approximately 11,520 Mbytes/second for the LAP. A version of the VSoC is shown and described in commonly assigned U.S. patent application Ser. No. 12/184,187, entitled VISION SENSORS, SYSTEMS AND METHODS, by E. John McGarry, et al., the teachings of which are incorporated by reference as useful background information, and also described in pertinent part below. More generally, the system and method herein can be adapted to operate on a variety of commercially available vision acquisition and processing systems. For example, an early version of a single-chip image sensor is described in the publication *Single-Chip Image Sensors With a Digital Processor Array*, by Robert Forchheimer, et al., Journal of VLSI Signal Processing, 5, 121-131 (1993).

I. Vision System on Chip (VSoC) Overview

Figure 1:
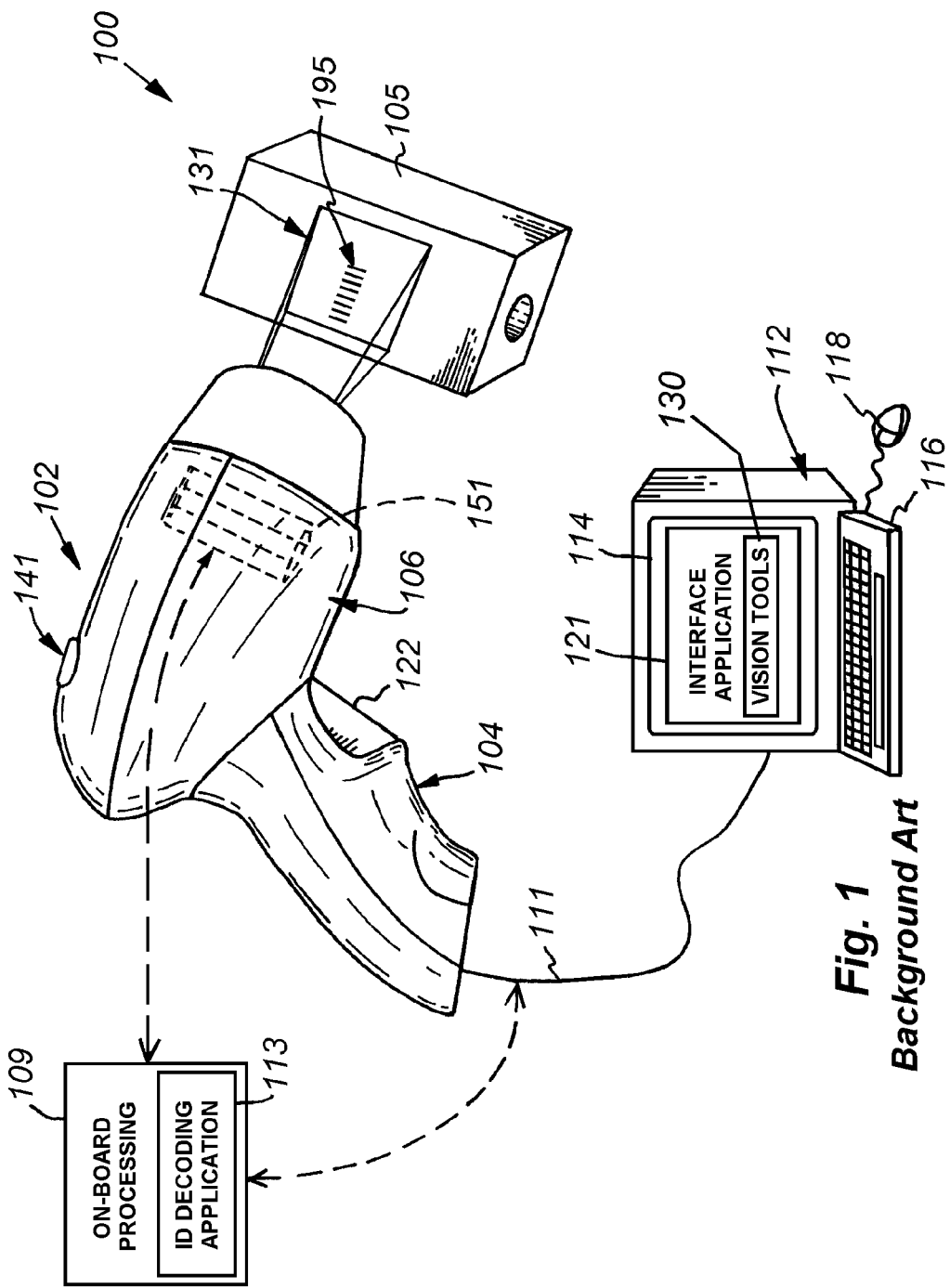
FIG. 1, already described, is a perspective view of a handheld scanning system with an onboard processor and ID decoding application according to a prior implementation.
Figure 2:
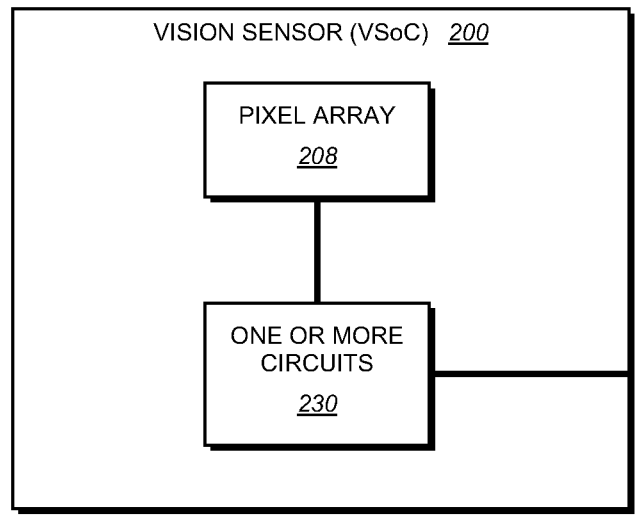
FIG. 2 is a block diagram of an exemplary vision system on a chip (VSoC) according to an illustrative embodiment.

FIG. 2 illustrates a block diagram of a single chip vision system 200 (VSoC) for use with the system and method in accordance with an embodiment of the present invention. The VSoC 200 includes a pixel array 208 and one or more circuits 230 on a single chip. As used herein, the term chip, can also be used interchangeably with the well-known term "die". That is, a single, unitary piece of silicon wafer having the appropriate circuit elements and traces laid out thereon. In manufacture, the chip or die can be part of a larger wafer of chips or dies that are separated into discrete packages at a given stage of the manufacturing process, but thereafter maintained as a unitary component. In various embodiments, the pixel array 208 is configured to provide pixel signals to the one or more circuits 230 based on sensed light for a scene being imaged. Also, in various embodiments, the one or more circuits 230 are configured to process the pixel signals provided from the pixel array 208 to form an image, and optionally are configured to perform pattern matching with respect to the image. In various embodiments, the pixel array 208 and the one or more circuits 230 form a single integrated circuit on a substrate of semiconductor material. Also, in various embodiments, the VSoC 200 includes one or more I/O pins (not shown) for inputting data to and outputting data from the VSoC 200.

The VSoC 200 can be employed in various applications, such as machine vision applications, consumer applications, or the like. In various embodiments, the VSoC 200 may be employed in applications in which there is a need for one or more of (i) image acquisition; (ii) image pre-processing; and (iii) pattern matching. In various embodiments, the VSoC 200 allows for performing image acquisition, image pre-processing, and/or pattern matching in a single chip or integrated circuit. More particularly, the vision sensor of the illustrative embodiment can be employed to detect and identify particular symbology features, such as, but not limited to 1D barcode features placed on an object to be scanned. The 1D barcode in an exemplary implementation can comprise a conventional UPC-A type code, but a variety of other 1D code arrangements can be scanned and detected in accordance with illustrative embodiments.

By way of further background, note that a 1D or "linear" barcode presents a given set of information in a single dominant orientation. That is, the barcode features are parallel with respect to each other and these features are all aligned in a single dimension. All barcodes are defined by two orthogonal dimensions (with etched or peened barcodes using a third dimension to resolve contrast differences). In the case of the barcode of FIG. 2, and others herein, the vertical dimension does not present a data content, rather, the orientation of widths and spacings of bars in the horizontal direction carries the data content. This horizontal dimension is considered the dominant orientation. For the purposes of this description, the term "symbol" shall also refer generally to barcodes of a type contemplated herein. A more-complete list of linear barcodes to which this invention is applicable can be found on the World Wide Web at the web sites, http://www.aimglobal.org/aimstore/linearsymbologies.asp.

Figure 3:
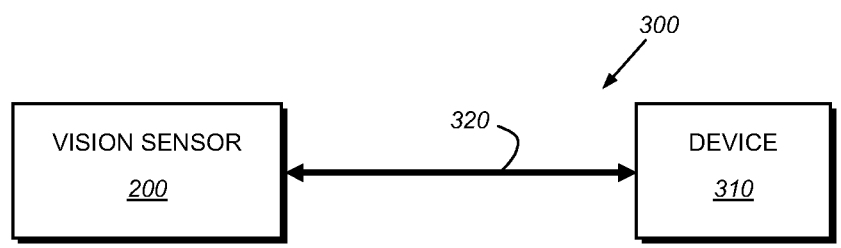
FIG. 3 is a block diagram showing the interconnection of the VSoC of FIG. 2 with an associated device.

With further reference to the VSoC 200, FIG. 3 illustrates a block diagram of an interconnected system 300 in accordance with an embodiment of the present invention. The system 300 includes the VSoC 200 and an interconnected device 310, operatively connected by a wired or wireless network or other data connection 320. In the system 300, the VSoC 200 is in communication with the device 310 and signals are transmitted between the device 310 and the VSoC. In an illustrative embodiment, the depicted device 310 can represent a component or components (such as a display, a separate ID decoder circuit, various indicators and alerts, etc.) of a scanning appliance, and/or a base computer (PC) or other data-processor that receives the ID data from the scanning appliance. The communication between the device 310 and the VSoC can include a variety of data and control signals. In various embodiments, the VSoC 200 is configured to acquire an image, and to perform processing on the image, and to provide data to the device 310 based on a result of the processing. For example, in various embodiments, the VSoC 200 is configured to search for one or more features in an image based on one or more models of the one or more features, and to output data to the device 310 based on a result of the search.

By allowing for performing both image acquisition to acquire an image and pattern matching to search for features in an image on a single chip or integrated circuit, an amount of data transmitted from the VSoC 200 may be reduced as compared to a case in which image data must be transmitted from the VSoC 200 to a separate processor external to the VSoC 200 for performing pattern matching by the separate processor.

For example, in various embodiments, the exemplary VSoC 200 can be employed to capture images, search the images for one or more features using a model of the one or more features, and then provide a trigger signal to the device 320 in cases where the one or more features are found in an image. Also, in some embodiments, the VSoC 200 can be employed to obtain images, search the images for one or more features using a model of the one or more features, and then provide location data indicating locations of the one or more features in a physical scene to the device 310 in cases where the one or more features are found in an image. As a consequence, in such embodiments, rather than transmitting entire image data from the VSoC 200 to a separate external processor to cause the separate external processor to perform a search for features, the VSoC 200 can perform the search on the vision sensor chip. In such cases, the VSoC can transmit the more-minimal information contained in a trigger signal, alignment/location data, feature data or the like, to the device 300—which allows for reducing an amount of data transmitted off-chip from the VSoC 200.

In various embodiments, reducing an amount of data transmitted from the VSoC 200 allows for increasing a speed, in frames per second, at which the VSoC 200 is able to acquire images, because the VSoC 200 operation is less constrained by the completion of transmission operations. For example, in some embodiments, the VSoC 200 may be configured to capture and process images at a rate greater than 200 frames per second, which could allow the VSoC 200 to be advantageously used for applications such as automated video surveillance, vehicle control, triggering and feature detection/extraction in ID readers/scanning appliances (as described below), gesture recognition, dimensioning of objects through three-dimensional (3D) modeling using a static or moving vision sensor, motion analysis, or the like.

In various embodiments, the VSoC 200 may be configured to self-trigger so that, in various embodiments, the VSoC 200 can image its surroundings continuously, acquiring a continuous stream of images. More particularly, the VSoC 200 can be configured to provide a trigger to be used as a software or hardware trigger for other vision applications, such as a software trigger for ID readers by which a region of interest containing an ID candidate is processed in an attempt to detect and identify ID features for decoding by an associated decoding process or application on, for example an interconnected device (as described further below).

Reducing an amount of data transmitted off-chip from the VSoC 200 also allows for lower power dissipation, since less current is needed to drive signals off the chip. Likewise, this reduces electromagnetic interference (EMI) due a reduced exchange of data between the VSoC 200 and external devices. Reducing power dissipation has advantages in many applications, such as battery limited applications, including those associated with wireless, handheld ID scanners.

In some embodiments, the device 310 is a type of device that is capable of processing image data and the VSoC 200 is configured to transmit image data to the device 310. In the below-described illustrative embodiment, the device 310 includes the various components of a handheld scanning appliance including a digital signal processor (DSP) with an instantiation of a ID decoding application, as well as a base data handling and storage device (a networked PC with a wireless interface, for example) that receives and manipulates the decoded IDs. In some embodiments in which the VSoC 200 is configured to transmit image data to the device 310, the VSoC 200 is configured to search an image for one or more features using a model of the one or more features, and to transmit image data of the image to the device 310 only if at least one of the one or more features are found in the image. Also, in some embodiments in which the VSoC 200 is configured to transmit image data to the device 310, the VSoC 200 is configured to search an image for one or more features using a model of the one or more features, and to transmit to the device 310 only image data for regions of interest in the image that are determined based on identified features from the search. In various embodiments in which the VSoC 200 is configured to transmit image data to the device 310, the VSoC 200 may be controllable to send entire image data for images to the device 310. In some embodiments, the VSoC 200 is configured to transmit pose information to the device 310 that indicates poses of a model relative to an image for which one or more features have been detected.

In various embodiments, the device 310 can comprise a processor, and the VSoC 200 can be configured to interactively exchange processing tasks with the processor of the device 310 and/or to allow a user to specify which specific tasks are to be performed by each of the VSoC 200 and the processor of the device 310, so as to allow, for example, for optimization of throughput, use of memory, or the like. Also, in various embodiments, the device 310 may comprise a processor, and the VSoC 200 may be configured to determine candidate images or portions of images that may contain one or more features and then transfer the candidate images or portions of images to the device 310 for further processing by the device 310. In some embodiments, the VSoC 200 can be used in connection with one or more other components (not shown), such as auto-focusing optics, adaptive equipment, or the like, to provide different depths of field or different illumination, for example, while acquiring images and optionally processing them, within a useful time period for various applications, such as ID-reading applications, or the like. Likewise, as described above, and in further detail below, the device can include an ID-decoding DSP.

The exemplary VSoC described herein, and other implementations generally contemplated desirable act as a so-called data "funnel" in that these implementations facilitate the conversion of a set of captured image data into a reduced size of data to be transmitted to the device 310 while retaining the meaningful informational aspects of that reduced data set sufficient to perform further back-end and/or off-chip processing. By way of example, such funneling operations include but are not limited to (a) processing the image data from the array to generally reduce the size and/or depth of the device-transferred image; (b) processing the image to extract features of reduced size when compared to the original image, and transferring the reduced-size feature set to the device; and (c) processing numerous image frames, and transmitting a reduced number of images therefrom, either in their entirety, or with a reduced set of data. Furthermore, the VSoC implementations contemplated for use in accordance with the system and method herein generally enable the preprocessing of an image or other or other processed data (e.g. edges, ROIs, etc.), and transmission of this preprocessed data to a device (310) where the preprocessing is more efficiently accomplished by the VSoC, than the device. This allows for increased throughput speed, as the raw data is preprocessed more quickly in the VSoC to yield the more focused data set that may be more slowly processed by the device. In various implementations, the existence of a highly parallel processing environment, wherein the pixel data from an image can be simultaneously processed as large groupings (captured pixel data rows for example) facilitates the rapid preprocessing thereof. Certain operations that benefit from large-group processes, such as neighborhood operations, are carried out with substantially increased efficiencies in such parallel environments.

As will be described further below, with reference to the illustrative system and method, the funneling aspect of the implementation is enhanced by the fact that various VSoC implementations in accordance with this invention enable processing of stored data to generate more-refined and/or smaller-sized data sets to occur contemporaneous with the readout of data from the pixel array into a buffer memory. In an embodiment, this processing is performed in a row-by-row basis, but other groupings of simultaneously processed data are also contemplated. This is due to the high speed at which data can be processed versus the frame-per-second (FPS) capture rate of raw image data.

Figure 4:
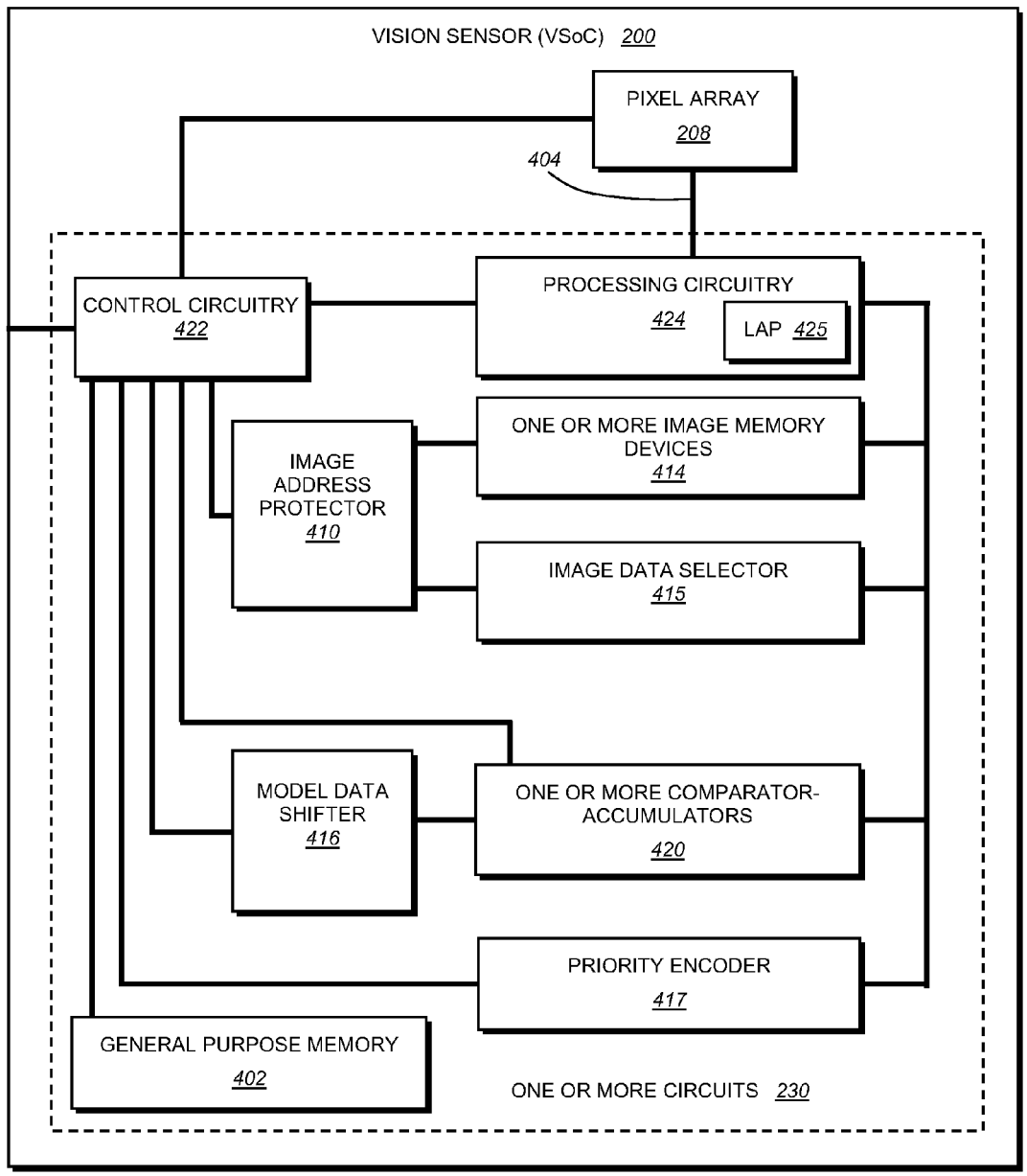
FIG. 4 is a block diagram showing the functional components of the VSoC of FIG. 2.

FIG. 4 illustrates the internal architecture of an embodiment of the VSoC 200. The VSoC 200 includes the above-described pixel array 208 and the above-described one or more circuits 230 (FIG. 2). In various embodiments, the one or more circuits 230 include control circuitry 422, a general purpose memory 402, processing circuitry 424, an image address processor 410, one or more image memory devices 414, an image data selector 415, a model data shifter 416, one or more comparator-accumulators 420, and a priority encoder 417.

In various embodiments, the pixel array 208 is configured to provide one or more pixel signals based on sensed light for a scene being imaged. Also, in various embodiments, the processing circuitry 424 is configured to process the one or more pixel signals provided from the pixel array 208 to generate an image. In general, the processing circuitry of an illustrative embodiment is implemented as a SIMD architecture in which an entire row of pixel data transferred from the pixel array 208 is processed simultaneously, being transmitted over a wide bus 404 that also communicates with one or more image memory devices, also characterized by a wide bus capable of reading in or out the entire row of image pixel data simultaneously (i.e. on a common clock cycle). In some embodiments, the one or more pixel signals provided from the pixel array 208 are analog signals, and such signals are converted to digital signals prior to processing by the LAP by appropriate ADC circuits. In various embodiments, the processing circuitry 424 is configured to perform one or more pre-processing operations on the digital pixel values obtained from the one or more pixel signals, so as to provide pre-processed image data.

By way of example, in various embodiments the processing circuitry 424 is configured to perform pre-processing for noise reduction to reduce noise in the digital pixel values. Image noise is random fluctuations of pixel values, which may be caused by electronic noise in the VSoC 200, or the like. In various embodiments, the processing circuitry 424 is configured to accomplish noise reduction through a filtering process, such as median filtering in which an original pixel value is replaced with a median value of intensities of neighboring pixel values. This noise reduction filtering function is described further below. In some embodiments, the processing circuitry 424 is configured to perform other types of filtering, such as low-pass filtering in which noise is reduced by convolving data of the pixel values with a mask that represents a smoothing operation so as to try to bring each pixel value closer to values of neighboring pixel values. It should be appreciated that median filtering and low-pass filtering are merely provided as examples of types of filtering and that, in various other embodiments, the VSoC 200 may be configured to perform other types of filtering.

In various embodiments, the processing circuitry 424 is also configured to perform pre-processing to convert a 6-bit or 8-bit (or other value) grayscale pixel values to 1-bit binary pixel values. In some embodiments, the processing circuitry 424 is configured to perform a thresholding process that converts a grayscale pixel value into either an absolute black pixel value or a white pixel value based on, for example, a comparison between the grayscale pixel value and a threshold value. Such thresholding processes allow for binarization of pixel values. In various embodiments, the processing circuitry 424 is also configured to perform a morphological closing operation on data in which a dilation is performed using a structuring element and then an erosion is performed on the resulting data using a structuring element. Such morphological closing operations may be employed, for example, to shrink background color holes that are within foreground regions in an image.

In various embodiments, the one or more image memory devices 414 are configured to store image data of an image. For example, as described above, in various embodiments, the processing circuitry 424 performs processing on pixel data provided from the pixel array 208 and stores a result of the processing in the one or more image memory devices 414 as pixel intensity data of a captured image. In various embodiments, the one or more image memory devices 414 each comprise a random access memory (RAM), or the like, for storing and providing data. The size and layout of the RAM can be provided so that the rows of memory include addresses that correspond to the rows of the pixel array 208. Likewise the individual SIMD processors in the processing circuitry (collectively defining the above-described LAP) 425 can number the same as the number of elements in a given pixel array and memory row. In various embodiments, the control circuitry 422 is configured to control the pixel array 208 to capture light and provide pixel signals, and is configured to control the processing circuitry 424 to process the pixel signals from the pixel array 208 to provide image data of an image. In some embodiments, the pixel array 208 is configured to capture light that is in the visible spectrum and to provide pixel signals based on the captured light. In some embodiments, the pixel array 208 is configured to capture light that is also (or alternatively) outside of the visible spectrum and to provide pixel signals based on the captured light. In some embodiments, the pixel array 208 is configured to allow for capturing light from both the visible spectrum and outside of the visible spectrum and to provide pixel signals based on the captured light.

In various embodiments, the control circuitry 422 is configured to receive model instructions from an external device such as the above-described PC for a model of one or more features, and is configured to store the model instructions in the general purpose memory 402. In various embodiments, the general purpose memory 402 comprises a RAM, or the like, for storing and providing data. In various embodiments, the general purpose memory 402 stores programs that can be executed by the control circuitry 422. In some embodiments, the general purpose memory 402 may be supplemented with an external memory (not shown) that is external to the VSoC 200, and the VSoC 200 can be configured in such embodiments to allow for transferring data between the external memory and the general purpose memory 402. In various embodiments, elements of FIG. 4 can be supplemented or omitted if desired for various different applications—some of which variations are described below with reference to the illustrative system and method.

In various embodiments, the one or more circuits 230 are configured to search an image for one or more features using a model of the one or more features. In some embodiments, an image to be searched is stored in the one or more image memory devices 414, and model instructions of a model of one or more features to be used to search the image are stored in the general purpose memory 402. Also in various embodiments, the control circuitry 422 is configured to execute the model instructions from the general purpose memory 402, and to control the processing circuitry 424, the image address processor 410, the model data shifter 416, and the plurality of comparator-accumulators 400 based on the model instructions. In some embodiments adapted to perform image-matching and object/feature pose (alignment) determination, each model instruction includes corresponding coordinates that specify a position with respect to a model reference point. Also, in some embodiments, the control circuitry 422 is configured to provide coordinates from model instructions of a programmed image model to the image address processor 410, and the image address processor 410 is configured to transform the coordinates into transformed coordinates based at least partially on one or more transform values. In various embodiments, the image address processor 410 allows for transforming coordinates of a model in accordance with a geometric transformation.

Having the ability to transform coordinates of a model in accordance with a geometric transformation provides an advantage when searching for features in images where the features in the images may be rotated at different angles, scaled to different sizes, or translated to different positions in different images. In some instances, with the ability to geometrically transform a model of a feature, the model may be used to detect the feature in images regardless of a rotation, scale, or location of the feature in the images. In various embodiments, the image address processor 410 is configured to transform one or more coordinates of a model in accordance with one or more affine transform values.

In various embodiments, the image address processor 410 is configured to provide a first coordinate of transformed coordinates to the one or more image memory devices 414 to access the one or more image memory devices 414 and to cause the one or more image memory devices 414 to provide data addressed by the first coordinate of the transformed coordinates to the image data selector 415. In various embodiments, the image address processor 410 is also configured to provide a second coordinate of the transformed coordinates to the image data selector 415 to cause the image data selector 415 to shift the data received from the one or more image memory devices 414 by an amount that is based on the second coordinate of the transformed coordinates.

In various embodiments, the control circuitry 422 is configured to provide accumulation increments and one or more values to the model data shifter 416 from a model, and the model data shifter 416 is configured to provide the one or more values and the accumulation increments to the one or more comparator-accumulators 420. In embodiments, the one or more comparator-accumulators 420 are configured to compare one or more values obtained based on data of an image to be searched with one or more values from a model. Also, in various embodiments, the one or more comparator-accumulators 420 are configured to selectively perform accumulation to accumulate accumulation increments based on results of the comparisons.

In various embodiments, the processing circuitry 424 is also configured to receive accumulated values from the one or more comparator-accumulators 400 and to form a binary tag word to indicate local maximum responses to comparisons between an image and model data. Additionally, the priority encoder 417 can be configured to receive a binary tag word from the processing circuitry 424 and to provide output to the control circuitry 422 based on the binary tag word. In various embodiments, the control circuitry 422 is further configured to provide output from the VSoC 200.

Figure 5:
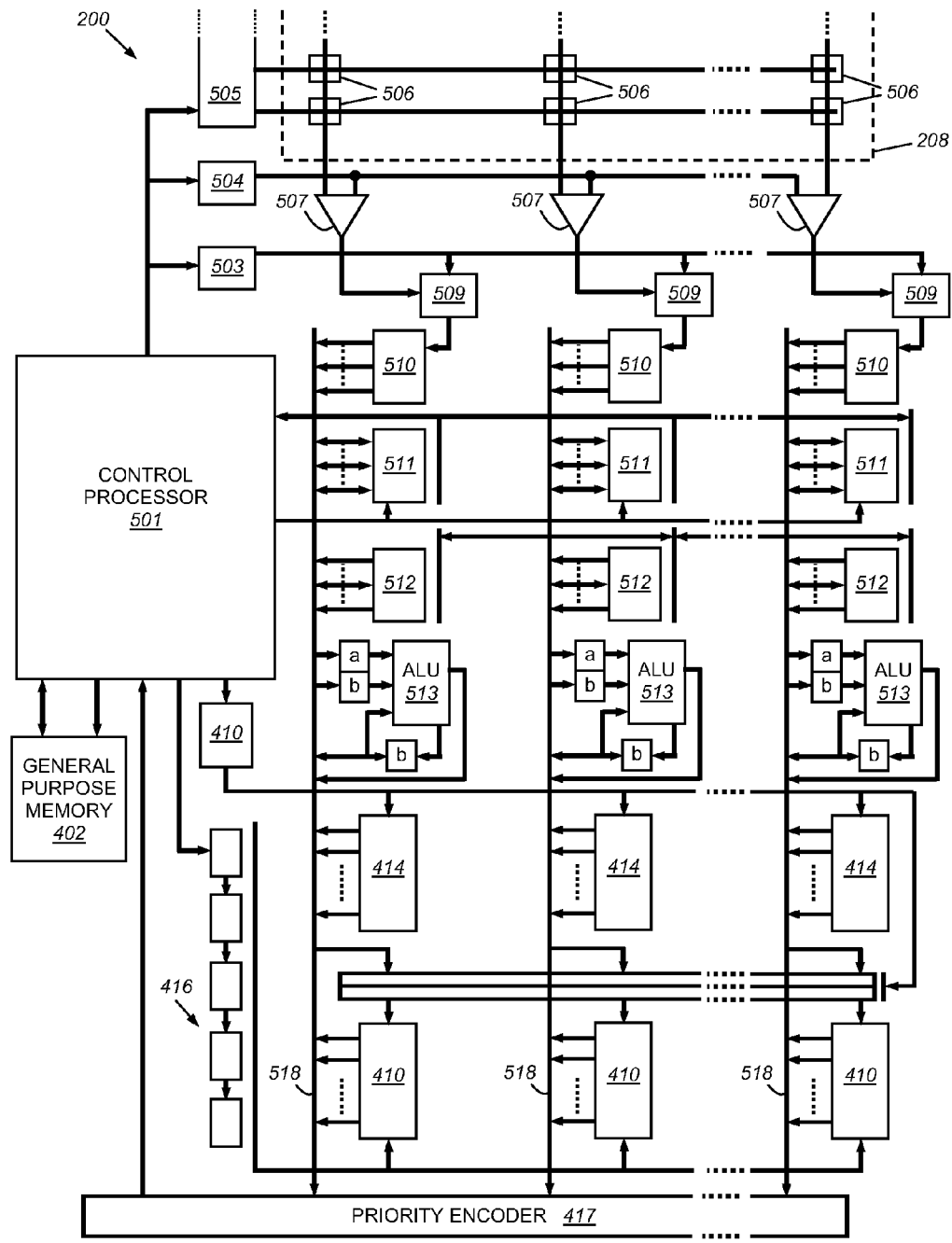
FIG. 5 is a more detailed schematic diagram showing functional components of the VSoC of FIG. 2 and including details of individual components of the linear array processor (LAP) according to an illustrative embodiment.

FIG. 5 illustrates a more detailed depiction of an embodiment of the VSoC 200. In various embodiments, the VSoC 200 includes the above-described pixel array 208, along with a pixel controller 505, a plurality of analog comparators 507, an analog ramp generator 504, a plurality of analog-to-digital converter (ADC) latches 509, and a digital ramp generator 503. In various embodiments, the pixel array 208 includes a plurality of pixel circuits 506 that are arranged in rows and columns. Also, in various embodiments, each pixel circuit 506 comprises a light-sensitive element or photodetector, such as a photodiode or the like, to sample light intensity of a corresponding portion of a scene being imaged, and each pixel circuit 506 is configured to provide an analog pixel signal based on the sampled light intensity.

In various embodiments, the pixel controller 505 supplies control signals to the pixel circuits 506 in the pixel array 208 to control an operation of the pixel circuits 506. In some embodiments, pixel circuits 506 that are in a same row of the pixel array 208 share a common row control signal from the pixel controller 505, and pixel circuits 506 that are in a same column of the pixel array 208 share a common column readout line to provide output. In various embodiments, the pixel controller 505 controls the pixel circuits 506 to provide output of data in a row-by-row manner. Also, in various embodiments, the analog pixel signals output from each column of pixel circuits 506 in the pixel array 208 are input to a corresponding analog comparator 507.

In various embodiments, analog-to-digital conversion of analog pixel signals output from the pixel array 208 is performed using the plurality of analog comparators 207, the analog ramp generator 204, the plurality of ADC latches 209, and the digital ramp generator 503. In some embodiments, analog pixel signals output at each column of the pixel array 508 are compared, in the corresponding analog comparator 507, to a common analog reference level generated by the analog ramp generator 504. Also, in some embodiments, the digital ramp generator 503 is configured to produce a digital signal that is representative of the analog reference level generated by the analog ramp generator 504. In various embodiments, in a case where on any given column the analog reference level equals a level of the analog pixel signal, the corresponding analog comparator 507 generates a digital output that causes a corresponding ADC latch 509 to latch a value of the digital signal supplied by the digital ramp generator 503.

In various embodiments, the VSoC 200 further includes a control processor 501, the above-described general purpose memory 402, a plurality of image input registers 510, a plurality of input/output (I/O) registers 511, a plurality of shift registers 512, a plurality of arithmetic logic units (ALUs) 513, a plurality of image memory devices 414 (described above), and a plurality of data paths 518 that interconnect the various circuit components via appropriately sized buses. In various embodiments, the control processor 501 is connected to the general purpose memory 502, from which it obtains programs and models to execute to control elements of the VSoC 200. In various embodiments, each ADC latch 509 is connected to a corresponding image input register 510, and each image input register 510 is connected, by output data lines, to a corresponding branch of the data path 518.

In various embodiments, each data path 518 includes a serial data path that carries data in bit-serial form. In various other embodiments, each data path 518 can include a plurality of data lines for carrying data. In some embodiments, the plurality of data paths 518 are part of a bus. Also, in some embodiments, there is at least one data path 518 for each column of pixel circuits 506 in the pixel array 208. In various embodiments, each data path 518 is connected to a corresponding image input register 510, a corresponding I/O register 511, a corresponding shift register 512, a corresponding ALU 513, and a corresponding image memory device 414. Also, in various embodiments, the plurality of I/O registers 511 are each connected to the control processor 501 for inputting data from and outputting data to the control processor 501. In some embodiments, the plurality of shift registers 512 are each connected to their immediate neighbors on the left and right, if present. Also, in some embodiments, each ALU 513 is connected to the corresponding data path 518 through a set of corresponding registers, which include at least two data input registers (a and b), and a carry register (c).

In various embodiments, each image input register 510 makes digitized image data available, by way of the corresponding data path 518, to the corresponding I/O register 511, the corresponding shift register 512, the corresponding ALU 513, and the corresponding image memory device 414. In various processing operations, image data is buffered in the plurality of image memory devices 414 and processed using the plurality of ALUs 513 that collectively comprise part of the LAP 425. In various embodiments, processed image data or other data may be accessed by the control processor 501 though the plurality of I/O registers 511 for secondary data processing and/or external communication of data with devices that are external to the VSoC 200.

With reference to FIGS. 4 and 5, in various embodiments, the control circuitry 422 includes the control processor 501 and the pixel controller 505. Also, in various embodiments, the processing circuitry 424 includes the plurality of analog comparators 507, the analog ramp generator 504, the plurality of ADC latches 509, the digital ramp generator 503, the plurality of image input registers 510, the plurality of I/O registers 511, the plurality of shift registers 512, and the plurality of ALUs 513. In various embodiments, the one or more image memory devices 414 (FIG. 4) include the plurality of image memory devices 414 as illustrated in FIG. 5.

With further reference to FIG. 5, in various embodiments the VSoC 200 further includes the image address processor 410, the image data selector 415, the model data shifter 416, a plurality of comparator-accumulators 420, and the priority encoder 417. In various embodiments, each of the data paths 518 is connected to the image data selector 415. Also, in various embodiments, the control processor 501 is connected to the image address processor 410, and the image address processor 410 is, in turn, connected to address inputs of the plurality of image memory devices 414 and a control input of the image data selector 415.

In some embodiments, the control processor 501 is connected to an input of the model data shifter 416, and an output of the model data shifter 416 is connected to an input of each of the plurality of comparator-accumulators 420. Each comparator-accumulator 420 is also connected to receive input from the image data selector 415. In various embodiments, the image data selector 415 comprises a bi-direction barrel shifter, or the like. Also, in various embodiments, each of the plurality of comparator-accumulators 420 is operatively connected to a corresponding data path 518. In some embodiments, the priority encoder 417 is connected to each of the data paths 518 and is connected to the control processor 501. It should be appreciated that the connectivity and organization of the architecture of the VSoC 200 illustrated in FIG. 5 is provided by way of example, and in various other embodiments, the VSoC 200 may have other suitable arrangements.

Figures 6, 7:
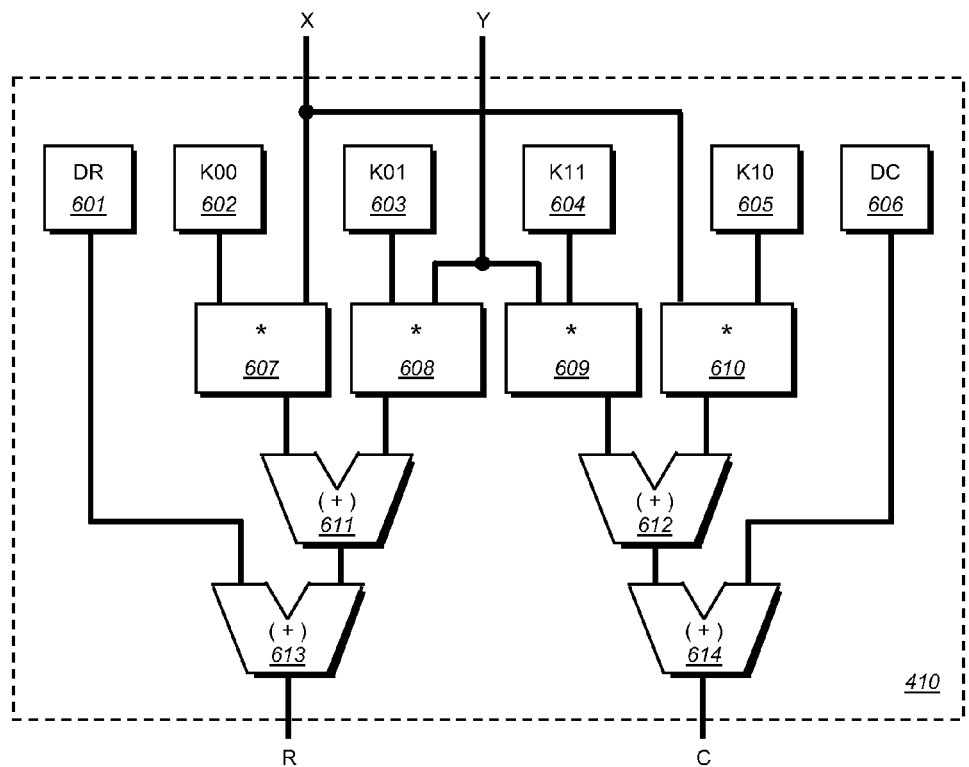
FIG. 6 is a block diagram of an image address processor of the VSoC of FIG. 2 for transforming coordinates of a model according to an illustrative embodiment.
FIG. 7 is a text block detailing exemplary equations for transforming coordinates of a model by the VSoC according to an illustrative embodiment.

FIG. 6 illustrates a block diagram of an embodiment of the image address processor 410 for use in the VSoC 200. In various embodiments, the image address processor 410 is configured to transform coordinates of a model into transformed coordinates based at least partially on one or more transform values. In various embodiments, the image address processor 410 includes transform coefficient registers 602, 603, 604, and 605, an image row offset register 601, and an image column offset register 606, for storing transform values. In various embodiments, the image address processor 410 further includes signed multipliers 607, 608, 609, and 610, and adders 611, 612, 613, and 614.

By way of an example of the operation of the address processor, a first coordinate of a model (denoted X in FIG. 6), and a second coordinate of the model (denoted Y in FIG. 6) are provided as input to the image address processor 410. With reference to FIGS. 5 and 6, in various embodiments the control processor 501 is configured to fetch a model instruction of a model from the general purpose memory 402 and to provide coordinates that are included in the model instruction to the image address processor 410. For example, the control processor 501 can be configured to fetch a model instruction of a model, such as a first model instruction of the model that is provided as an example model, from the general purpose memory 402 and to provide coordinates that are included in the model instruction, such as the coordinates (−7, −2) in the example, to the image address processor 410. In the example, the value of −7 for a first coordinate would be provided as the X input to the image address processor 410, and the value of −2 for a second coordinate would be provided as the Y input to the image address processor 410.

As shown in FIG. 6, in various embodiments the transform coefficient registers 602, 603, 604, and 605 are writable to store affine transform coefficients K00, K01, K11, and K10, respectively, where the values of K00, K01, K11, and K10 are settable to enable performing desired transformations. In various embodiments, the image row offset register 601 is writable to store a row offset value DR, and the image column offset register 606 is writable to store a column offset value DC, where the values DR and DC are settable. In various embodiments the control processor 501 (FIG. 5) is configured to set the values K00, K01, K11, K10, DR, and DC in the image address processor 410 based on a desired geometric transformation for a model.

In various embodiments, the signed multiplier 607 receives an input from the transform coefficient register 602 and an input that is a first coordinate to be transformed, and provides an output to the adder 611. Also, in various embodiments, the signed multiplier 608 receives an input from the transform coefficient register 603 and an input that is a second coordinate to be transformed, and provides an output to the adder 611. In various embodiments, the signed multiplier 609 receives an input from the transform coefficient register 604 and an input that is the second coordinate to be transformed, and provides an output to the adder 612. Also, in various embodiments, the signed multiplier 610 receives an input from the transform coefficient register 605 and an input that is the first coordinate to be transformed, and provides an output to the adder 612.

In various embodiments, the adder 611 receives input from the signed multiplier 607 and the signed multiplier 608, and provides output to the adder 613. Also, in various embodiments, the adder 612 receives input from the signed multiplier 609 and the signed multiplier 610, and provides output to the adder 614. In various embodiments, the adder 613 receives input from the image row offset register 601 and the adder 611, and provides as output a first transformed coordinate (denoted R in FIG. 6). Also, in various embodiments, the adder 614 receives input from the image column offset register 606 and the adder 612, and provides as output a second transformed coordinate (denoted C in FIG. 6). Thus, in the embodiment of FIG. 6, the image address processor 600 allows for transforming coordinates (X, Y) into transformed coordinates (R, C) based on a plurality of transform values K00, K01, K11, K10, DR, and DC.

FIG. 7 shows a text box 710 with equations that specify a relationship between the (X, Y) inputs and the (R, C) outputs for the embodiment of the image address processor 410 of FIG. 6. As illustrated in FIG. 7, the equation for R is provided as R=X*K00+Y*K01+DR, and the equation for C is provided as C=X*K10+Y*K11+DC. Thus, the embodiment of the image address processor 410 of FIG. 6 allows for transforming coordinates of a model in accordance with geometric transformations, such as a rotation, a scaling, or a translation, by setting the transform values for a desired geometric transformation. By allowing for geometric transformations through use of the image address processor 410, a model of one or more features can be used for pattern matching for different rotations, scales, and translations of the one or more features in images.

In the embodiment of the image address processor 410 of FIG. 6, the image address processor 410 allows for transforming coordinates based on the six transform values of K00, K01, K11, K10, DR, and DC. Thus, the embodiment of the image address processor 410 of FIG. 6 allows for six degrees of freedom for transformations. Of course, it should be understood that in various other embodiments of the image address processor 410, more transform values than six may be employed to allow for more than six degrees of freedom for transformations. For example, in various embodiments, another three transform values are provided in the image address processor 410 and the image address processor 410 is configured to further allow for transformations for perspective distortions. It should also be understood that in various other embodiments, less transform values than six may be employed in embodiments of the image address processor 410. For example, various embodiments of the image address processor 410 may allow for setting just two transform values to allow for translations. Also, it should be appreciated that the embodiment of the image address processor 410 illustrated in FIG. 6 is provided by way of example of an implementation of an illustrative image address processor, and that in various other embodiments, alternate arrangements can be employed as an image address processor for use in transforming coordinates.

Figure 8:
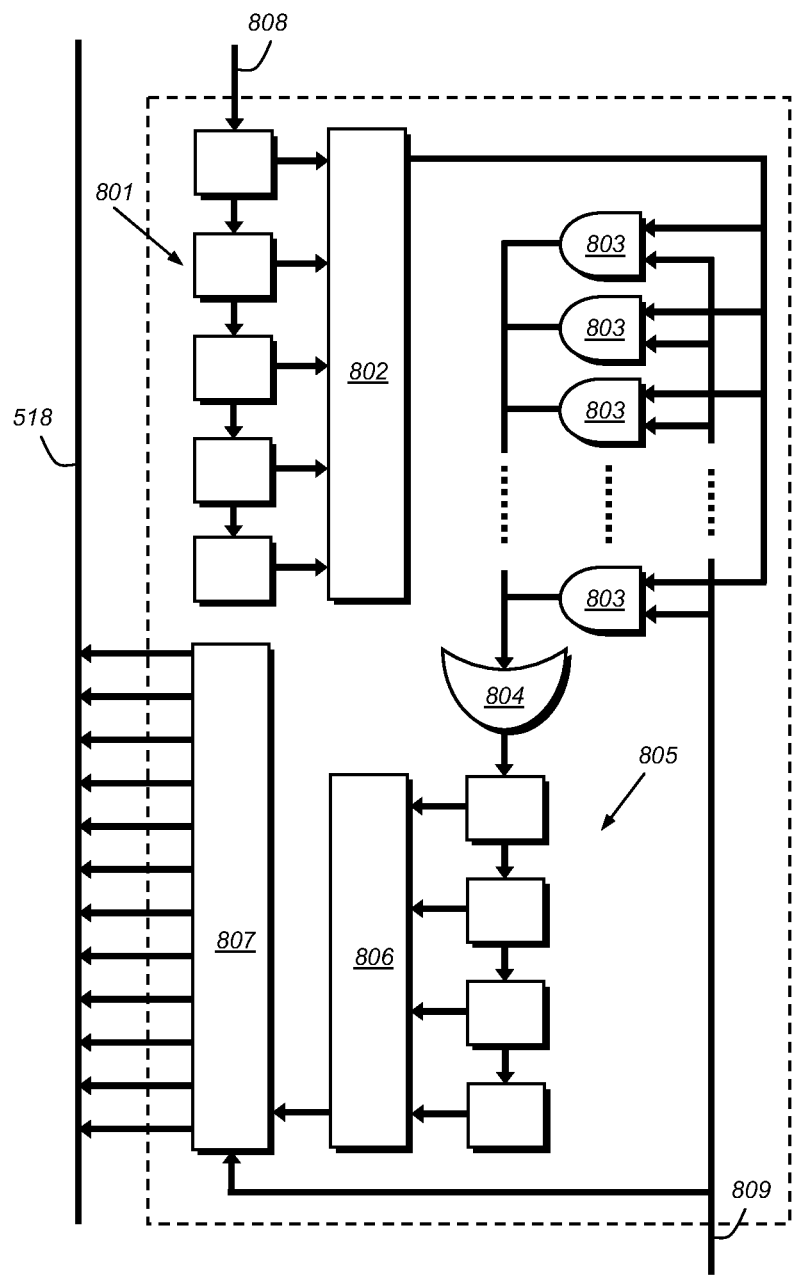
FIG. 8 is a schematic diagram of a comparator-accumulator of the VSoC of FIG. 2 according to an illustrative embodiment.

FIG. 8 illustrates a block diagram of an embodiment of a comparator-accumulator 420 for use in the VSoC (FIG. 4). In various embodiments, the comparator-accumulator 420 includes an image data shifter 801, an image data decoder 802, a plurality of AND gates 803, an OR gate 804, a match shifter 805, a match encoder 806, and a match accumulator 807. In various embodiments, the image data shifter 801 is configured to receive data on an image data input line 808 and to shift the data by one position within the image data shifter 801 each time the image data shifter 801 is clocked to shift. Also, in various embodiments, the image data shifter 801 is configured to provide output to the image data decoder 802.

In various embodiments, the image data decoder 802 is configured to decode a value provided from the image data shifter 801, and to provide each bit of a decoded value to a corresponding first input of a corresponding AND gate of the plurality of AND gates 803. Also, in various embodiments, each bit of one or more model values of a model is provided over one or more model data input lines 809 to a corresponding second input of a corresponding AND gate of the plurality of AND gates 803.

In various embodiments, bits from an image may be shifted into the image data shifter 801 and then decoded by the image data decoder 802 through binary expansion into a bit string with a "1" bit in a bit position corresponding to a decimal value of a binary number in the image data shifter 801, and a "0" bit in all other positions, where a low-order bit in the decoded bit string corresponds to a bit position of 0. Then, in various embodiments, the decoded bit string from the image data decoder 802 may be compared using the plurality of AND gates 803 with the bit string provided over the one or more model data input lines 809 that has been reconstructed from values in a model. In various embodiments, the OR gate 804 receives an output of each of the plurality of AND gates 803, and provides an output bit of "1" in a case where any of the outputs of the plurality of AND gates 803 is "1". In some embodiments, the OR gate 804 can be replaced with a plurality of OR gates configured to determine if any of the plurality of AND gates 803 have output a bit with a value of "1". In various embodiments, an output of the OR gate 804 is indicative of whether or not a match has been found between image data of an image and model data of a model for a particular geometric transformation of the model and a particular positioning of the geometrically transformed model with respect to the image. In various embodiments, the plurality of AND gates 803 and the OR gate 804 may be considered as a comparator. Of course, it should be appreciated that the plurality of AND gates 803 and the OR gate 804 are provided by way of example, as an arrangement for performing a comparison, and that in various other embodiments, other types of comparators can be employed.

In various embodiments, an output of the OR gate 804 is provided to the match shifter 805, and the match shifter 805 is configured to input a bit provided from the OR gate 804 and to shift the other bits in the match shifter 805 by one position each time the match shifter 805 is clocked. In various embodiments, data in the match shifter 805 is output to the match encoder 806, and the match encoder 806 is configured to encode a value represented by the stored bits in the match shifter 805, and to provide an output to a clock of the match accumulator 807. In various embodiments, the match accumulator 807 receives an accumulation increment of a model over the one or more model data input lines 809, and is configured to accumulate the accumulation increment when clocked based on a value of an output of the match encoder 806. Also, in various embodiments, the match accumulator 807 is configured to output a value that has been accumulated in the match accumulator 807 to a corresponding data path 518.

In various embodiments, the control circuitry 422 (FIG. 4) is configured to send a signal to each of the comparator-accumulators 420 to cause the match accumulator 807 in each of the comparator-accumulators 420 to be reset to a default value when the control circuitry 422 executes a model instruction that includes a reset command. Also, in various embodiments, the control circuitry 422 is configured to send a signal to allow for accumulation by the match accumulator 807 in each of the comparator-accumulators 420 when the control circuitry 422 executes a model instruction that includes a compare command. In such embodiments, the match accumulator 807 in each of the comparator-accumulators 420 can also be clocked by an output of the corresponding match encoder 806, such that when accumulation is allowed, the match accumulator 807 either performs or does not perform accumulation depending on a value output from the corresponding match encoder 806.

II. VSoC System Implementation

Figure 9:
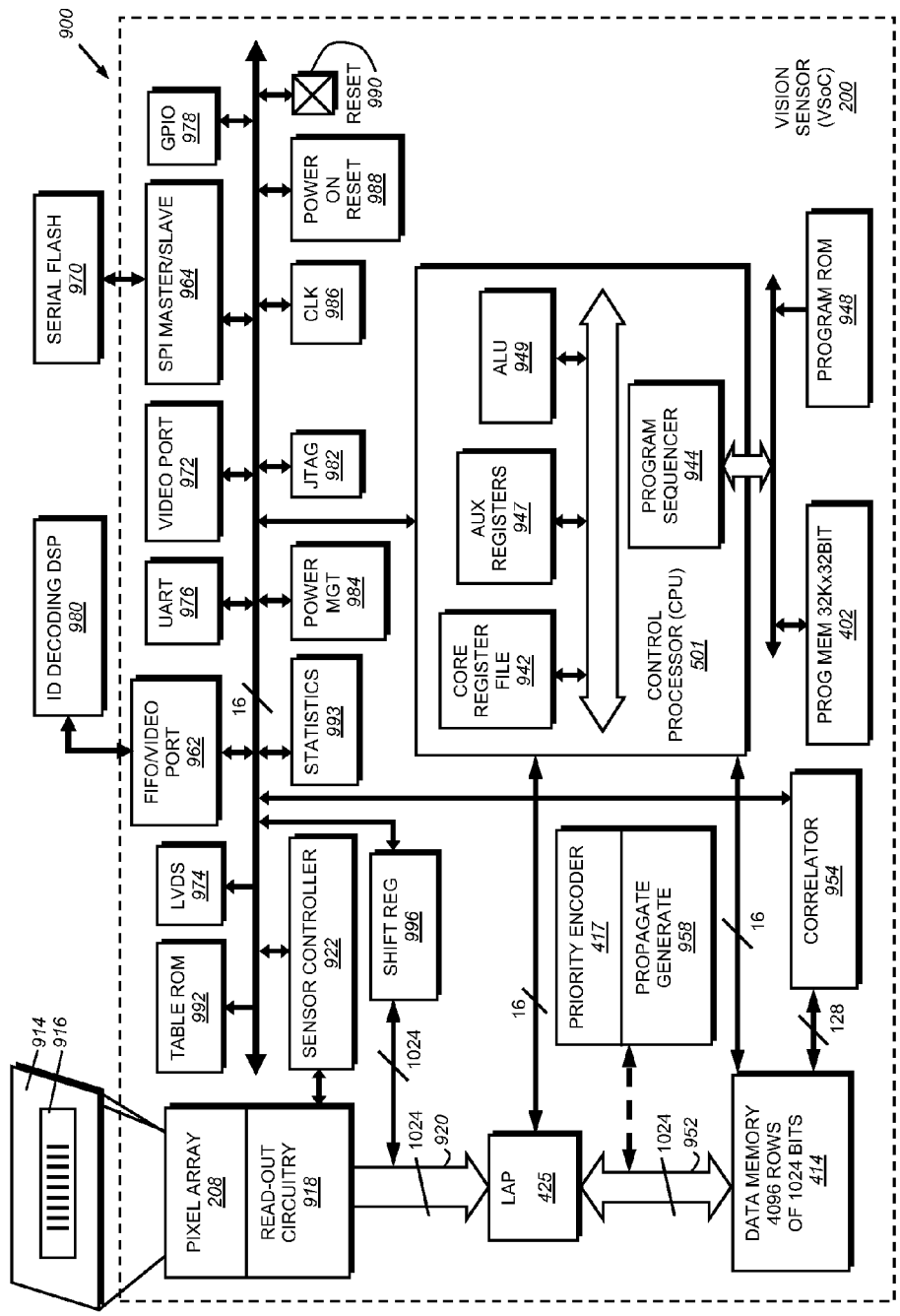
FIG. 9 is a block diagram of a version of the VSoC employed in an implementation of the ID detection, identification and feature extraction process according to an illustrative embodiment.

In an illustrative embodiment of the system and method for detecting, identifying and extracting ID features, the vision sensor (VSoC) 200 as implemented in an overall scanning appliance architecture 900 is provided in accordance with FIG. 9. Various elements shown and described with respect to the above-described illustrative VSoC 200 are reorganized for ease of cross-reference to functions in the present system and method. For example, elements of the read-out circuitry 918 shown in FIG. 9 reside partially within the above-described control circuitry 422 and partially within the processing circuitry 424 (FIGS. 4 and 5). Likewise, the LAP 425 is shown as part of the overall processing circuitry 424. Additional functions and interconnections (for example, ID decoding DSP 980 and various communication ports) are also shown in FIG. 9 to assist the reader in further understanding the environment of the exemplary (or an alternate) VSoC architecture upon which the illustrative system and method can operate.

The depicted pixel array 208 is shown imaging an ROI 914 containing an exemplary 1D barcode 916. The orientation of the pixel array 208 with respect to the barcode 916 is highly variable in angle and rotation. Likewise, the pixel array can be expected to move with respect to the barcode, with the frame rate of image capture and processing contemplated in accordance with this embodiment being capable of more-reliably capturing needed information for decoding in the presence of such movement. The illustrative pixel array can be configured as 1,028 columns by 786 rows. Such an array can include two dummy rows and columns on the top/bottom and left/right to avoid boundary effects, thus providing the illustrative 1,024-row×782-column active 8-bit (or alternatively 6-bit) pixel array. Interconnected readout circuitry 918, including ADC circuits, and associated functionality as described above, converts the analog sensor output to digital pixel data that is read out as 1024-wide rows over an associated bus 920 to the linear array processor (LAP) 425 in accordance with an illustrative embodiment.

The image capture process within the pixel array 208 is handled by the sensor controller 922. In an exemplary implementation, it consists of a programmable finite state machine (FSM) that generates the waveforms required to control the operation for each row of pixels in the array and the sequence of events for the readout circuitry. The operation of the sensor controller 922 can be programmed by the user via configuration registers 942 within a separate 16-bit processor 501 (the control processor 501 in FIG. 5 described above) that is part of the VSoC 200, and is described further below. These registers 942 configure all the programmable parameters of the pixel array 208 and readout circuitry 918, including the parameters of the ROI, shutter mode, exposure time and the ADC resolution. Once an image frame is acquired, it is read out and converted to digital form on a 1024-wide row-by-row basis. In parallel with this readout and A/D conversion process, the LAP 425 processes the image according to the program code of the ROI-detection and feature-extraction application of this system and method (described below).

The LAP 425 is a parallel processor consisting of a one-dimensional array of 1,024 identical processing elements, each of them consisting of a 1-bit data path, 16 accumulator bits and a carry and an enable flag, as described generally above. The LAP 425 is implemented as a SIMD machine, so that all processors operate synchronously and perform the same operation but on different data.

Each LAP element can read and write one bit from a column (4,096 bits) of data memory. The row address is the same for all elements during an LAP-memory read or write cycle. Between the data memory and the LAP there is a barrel shifter that can be configured to shift the read-out data up to 13 places left or right. This permits each LAP element to have access (every clock-cycle) to the data from 13 columns left and right of its own position. The data memory (i.e. the one or more image memory devices 414 described above in FIG. 4) is interconnected via a vide 1024 bus 952 consists of four blocks of 1,024×1,024 bits. This memory is used to store the intermediate results of the image processing. It should be noted that the memory is adapted to store only portions of the overall processed image from the LAP. It also stores intermediate results of processing, such as ROI information and extracted features, as described below. Thus, data from the pixel array is constantly moved through the memory 414, being either disposed of if not relevant to a successful ID-finding operation, or moved on to a further step and processor, such as decoding, if the information shows promising ID characteristics. In a typical application, the acquired image is transferred to the LAP on a row-by-row basis. In the LAP 425, the data is processed to generate an equivalent binary image. This resulting binary image is progressively stored in the data memory for further processing. In some vision system embodiments, binary images can be processed by the VSoC's correlator 954 to obtain normalized correlation and pattern matching information. Where appropriate, it can be used to accelerate normalized correlation and to perform pattern matching in an image. The Priority Encoder is optimized for detecting transitions in an image row. The above-described priority encoder 956 (1024 bits wide) interacts with the memory 414 via the bus 952 to provide for the fast detection of set bits in a data memory row.

There are a number of image-processing operations that are performed on the LAP 425 where the connectivity or distribution of points within an image row must be found. In an illustrative embodiment, to accelerate these operations the VSoC 200 incorporates a custom logic block implementing "propagate-generate" functions across the array. Two possible applications of the propagate/generate unit 958 (on bus 952) are object location and "unknown point" resolution. The block is composed of 1,024 identical cells. Each cell has a pair of "propagate in" and "propagate out" signals communicating with the neighboring cells (corresponding to the right and left direction respectively). The inputs at the left and right sides of the array are set to zero. After writing an LAP 425 word to the propagate/generate unit, it illustratively requires 5 cycles until the value in the propagate/generate unit is valid.

The control processor 501 provides the VSoC 200 with a compact, fast processing unit that is separate from the LAP 425. The processor 501 in the illustrative embodiment is a 16-bit unit, but other sizes are contemplated. It provides efficient low-level image processing, and control for the LAP 425 and correlator 954. The processor 501 operates using a general purpose instruction set, and also supports additional special purpose instructions for operating on binary images, as such binary images are the typical mode of operation of the VSoC. The processor 501 supports interrupts, triggered from a number of sources including any major peripheral flags. As shown, the processor 501 is interconnected with the LAP 425 and the data memory 414 via a respective 16-bit bus 960, 962.

In an exemplary embodiment the control processor 501 (also termed herein the "CPU") is implemented using a Harvard architecture with reduced instruction set computing (RISC), providing separate memories for program and data, although the program memory can also be used for data storage. It defines sixteen general purpose registers, R0 to R14 and SP (942). These registers are each 16-bits wide in the illustrative implementation. There is also an illustrative 17-bit program counter/sequencer 944, which allows the processor to directly address 65,536 16-bit words in program RAM (i.e. general purpose memory 402 above), and the same amount in program ROM 948 (although in this embodiment only the ROM only has 48K active words at present). All computation is conducted between registers. Thus, values from memory are loaded into a register (942) before being operated-on.

The data memory 414 is accessed as 16-bit words via bus 962, using a register as a pointer. The register can be optionally pre-decremented or post-decremented or pre/post-incremented upon a memory access. A pointer plus constant offset addressing mode is also provided in the illustrative implementation. To allow accessing the full data memory of 256K words (512K bytes), a page register is used in the illustrative implementation. Binary images are packed into data memory with 16 pixels to a word. To allow efficient access, two pointer registers PX and PY are used. These are used to address a single pixel, and either or both can be independently post-incremented, post-decremented or left unmodified after an access. The PX register is 10-bits and the PY register is 12-bits to reflect the image mapping (1,024 columns by 4,096 rows).

A 128-word I/O space is also illustratively provided (not shown), which is directly accessed using absolute addressing. This contains many system and peripheral registers, with the remainder being occupied by scratch memory. An auxiliary register set 947 is also provided for additional register operations. The accumulator bank of the LAP 425 (1,024 words of 16-bits) can be accessed using the PX register as a pointer. ALU operations are conducted between working registers 942, 947 using an ALU 949 and a 16 by 16 multiplier-accumulator, which can take any two of the general registers as its operands. The 32-bit result of such operations is stored or accumulated to a 32-bit MR register (not shown). A shifter is illustratively provided that can shift down the MR register by between 0 and 31 places and put the result in a specified general register. The multiplier and shifter can be configured for either signed or unsigned operation.

The program memory 402 stores 65,536 words of 16 bits (part of the general purpose memory described above in FIG. 4). This RAM memory 402 can be physically organized as 32K words of 32-bits. The ROM 948 can be organized as 24K words of 32-bits. A page register determines whether the ROM or SRAM are accessed, with separate pages for program fetch, program memory read and program memory write. At boot-up, the processor 501 initially executes from the ROM. The ROM contains boot software which reads the processor's boot configuration pins to determine the desired secondary boot mode. These modes include booting from the host parallel port (FIFO) 962, booting from a host processor via the SPI slave port (964) and booting from serial flash 970 via the SPI master port (964), all of which are interconnected to the processor via the 16-bit communications bus 966. Note that an SPI channel is provided to implement full duplex serial communication that allows bi-directional transfers of register values and data to/from the RAM. The standard SPI master port is intended for accessing serial flash memory, or other peripheral devices. Two select pins are provided to allow connection to two compatible devices under software control. The slave SPI port can be used as an alternative interface to a host micro-controller. Once one of the available boot modes has been selected, the software loads code from the appropriate device and stores it in the program RAM 402. When all software has been loaded, control is transferred to the start of program RAM 402.

It should be clear that a variety of processor implementations can be employed in association with the LAP 425 of the illustrative VSoC in order to provide an efficient balance of parallel processing and serial processing tasks. In an illustrative embodiment, the CPU/processor 501 and LAP 425 do not operate simultaneously, and rather, require one of the two to remain idle while the other executes a given instruction. The depicted CPU/processor 501 is only one possible implementation according to an illustrative embodiment. Processors based on differing (non-Harvard and/or non-RISC) architectures can be implemented in alternate embodiments with appropriate interconnections to the LAP, data memory and other associated components.

In addition to the SPI port arrangement 964, a parallel (FIFO) port 962 is provided. This port is intended for communication with an off-chip host processor, microcontroller or other device, such as an exemplary ID-decoding DSP 980 of the illustrative embodiment. The DSP 980 repeatedly receives processed feature data from the data memory 414 via the LAP 425, and performs continual decoding of such data in an effort to deliver decoded IDs. This process is described in further detail below. Alternatively, the same pins can be used as a video port as shown, to output an image to another processor equipped with a video port. In an embodiment, a 512-word-wide host port can transfer a 1024 pixel row in approximately 25.5 uSecs, or approximately 51 images/second. Note that a separate, dedicated video port 972 can also be provided along the bus 966.

A low-voltage differential signaling (LVDS) port 974 is provided to transmit data serially at high speed over twisted pair lines. It uses a frame format composed of a start bit, ten data bits and a stop bit compatible with de-serializer ICs from a variety of commercial sources. In various embodiments, the LVDS port 974 can be employed as an alternative to the host port 962 for communication with the decode DSP 980. Additionally, a serial port in the form of a standard UART 976 is provided and a general purpose input/output (GPIO) port 978 is provided having, illustratively up to 16 GPIO lines, which are multiplexed with the pins of the other I/O ports along the bus 966. An IEEE standard joint test action group (JTAG) port 982 can be used as debug port, allowing a direct connection to nearly all internal devices through processor 501 and internal configuration registers. With this channel it is also possible to access the main memory and the internal devices. Power management functions (984), a system clock generator 986, reset functions (988 and 990) and a bus table ROM 992 are also illustratively provided in the VSoC 200. In addition, the bus 966 interconnects a statistics unit 993 responsive to the processor 501. This unit 993 illustratively calculates statistics during edge tracking operations. The statistics are stored in a set of I/O-mapped registers. Once the edge tracking is completed, the statistics can be used to determine the perimeter of the objects being tracked and the orthogonal and diagonal bounding boxes.

It should be clear that the above-described implementation of a VSoC is exemplary of a variety of possible processor implementations for use with the system and method according to illustrative embodiments. In alternate embodiments, the processor can be organized around a differing parallel architecture, with or without a separate control processor. Likewise, a processor or processors that is/are not highly parallel, and that possess appropriate speed and data-handling capabilities can be employed to perform the system and method of this invention. Thus, the term "VSoC" or "vision sensor" as use herein should be taken broadly to include a variety of processor architectures, including some in which certain operations described above are performed off-chip (off-die) by a separate component interconnected with other on-chip components.

For example, while the illustrative architecture herein includes the SIMD arrangement (LAP), memory, general purpose processor (CPU) and pixel array on a single chip/die, so as to define the VSoC architecture, it is expressly contemplated that (for example) the pixel array can reside off-chip/off-die and be operatively interconnected by appropriate leads. This may be desirable in certain implementations. For example, where the device form factor dictates certain geometries or where a pixel array that is separate from the processing assembly is desired.

III. Image Capture, ROI Determination and Optional Feature Extraction

Figure 10:
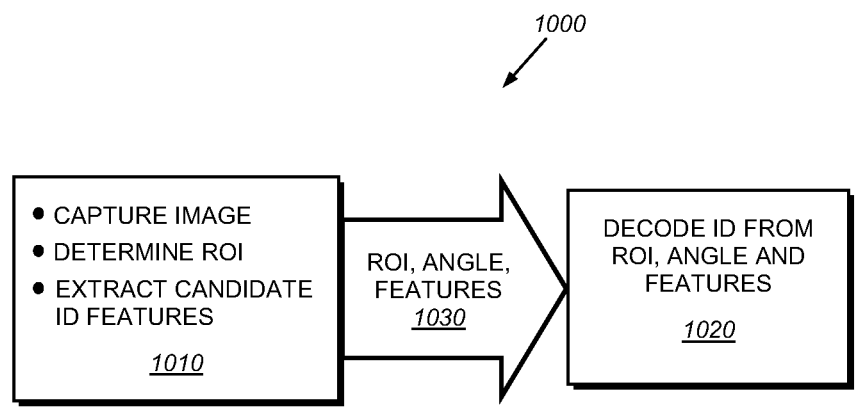
FIG. 10 is block diagram showing an overview of the ID detection, identification and feature extraction process showing the division of processes between the VSoC of FIG. 9 and an off-chip ID decoder according to an illustrative embodiment.

FIG. 10 details an overview 1000 of the system and method for capturing images in the area of an ID (for example a 1D barcode—such as a UPC A located on a variety of surfaces), determining an ROI potentially containing the ID and extracting candidate features from the ROI representative of the ID using the illustrative VSoC 200 or another appropriate processing system. In an illustrative embodiment, the overall process 1000 by which IDs are decoded into useable information by a scanning appliance, and associated peripherals, entails a division of the overall process 1000 into VSoC-based processes 1010 and separate decoder-based processes 1020. In this manner, the VSoC can be connected to a separate, efficiently-implemented decoder circuit, implemented for example as a DSP and executing any of a variety of commercially available ID decoding applications. The VSoC and the decoder are interconnected via an appropriate interconnection (using for example, the above-described host port 962). In general, such applications can derive a decoded data value given the ROI, relative angle of the detected ID features and the details of the ID features (e.g. the individual features' relative width, spacing, etc.), as represented by data connection 1030.

The depicted arrangement of the overall process 1000 allows the processing load to be distributed between a VSoC and a DSP processor. By employing the distribution of processes read-attempts per second (represented by the image capture rate) can be optimized, thereby increasing accuracy. The distribution of process also allows for an overall higher performance system (ROI determination, feature extraction, decoding) than available with currently available system and architectures and allows the more-efficient decoding of a variety of symbology including (but not limited) to various 1D code types, and potentially a variety of 2D code types.

A number of factors render a distribution of processing in accordance with the illustrative embodiment desirable. More particularly, the VSoC 200 according to the embodiments herein is significantly more efficient at neighborhood operations and barcode feature determination (for example contrast edges) than typical DSP processors. That is, the VSoC 200 can rapidly process edges based upon a number of adjacent (neighborhood) pixel data to a given pixel in a row due to the parallel operation of the LAP 425 on that entire row at once. In the illustrative implementation, the neighborhood is approximately ±13 pixels away from a given pixel. In addition, since, the illustrative VSoC may be less-efficient at data transfer than at image capture, reducing the amount of data transferred between the VSoC and the decoding DSP 980 should provide an improved image capture rate, than a system in which the DSP 980 is also responsible for capture and processing of raw image data. Likewise, the DSP 980 typically operates at a higher clock rate than the VSoC 200425 (90 MHz in an illustrative embodiment) so it can more quickly execute linear operations, such as barcode decoding (using any appropriate decoding application or algorithm). Likewise, the DSP 980 typically provides more program memory than the VSoC 200 in the illustrative implementation, rendering it better equipped to decode multiple symbologies in a single application.

The VSoC can provide increased ID-detection and determination efficiency in association with various embodiments of the illustrative system and method FIGS. 11, 16, 17 and 18 detail illustrative embodiments of the overall VSoC process, each transmitting data that can be used by an off-chip decoding device (a DSP executing a conventional or custom ID-decoding application) to derive decoded ID information. In one embodiment (shown with variations in FIGS. 11 and 16), the VSoC process consists of a front end (FE) and back end (BE) process that efficiently allocate the processing resources of the system between more-rapidly processed ID ROI-finding and tracking steps and higher-overhead, feature-extraction and ID-verification steps. The extracted features, ROI information and verified/refined data are provided to the decoding device. Optionally, the data transmitted to the DSP can also include raw, compressed or reduced-size (e.g. covering a smaller region of the overall image) image data (as also described in other embodiments below). This FE/BE embodiment generally provides the fewest false-positive ID detections, helping to ensure that the decoding DSP operates upon likely IDs, and so its bandwidth is not unnecessarily used to decode false-positive IDs. In another illustrative embodiment (FIG. 17) the BE process is essentially omitted from the VSoC process, and the tracked ROI data from the FE process is provided directly to the decoding device, executing an appropriate decoding application. The data transmitted includes, for example, the ROI position, size and orientation parameters, as well as a stream of the image data from the array (or a compressed or reduced-size version thereof) by which the decoding device can attempt to extract the ID by operating on image data that is associated with the region of the ROI. In yet another illustrative embodiment (FIG. 18), the VSoC process can simply provide a notification that ID like characteristics have been located (e.g. an ROI is detected), and thereby trigger the decoding device or another back-end, off-chip process to initiate a decoding operation based on an associated raw or compressed image data stream.

It is contemplated according to an alternate embodiment that the VSoC and the illustrative system and method operating thereon can be adapted to capture image ID information or presence data (ROI detection, for example) to provide a trigger to another VSoC or alternate vision sensor that uses the ID information as a notification to perform a more-in-depth vision system process (such as full ID detection and decoding). The pixel array resolution for the trigger VSoC can differ (typically smaller) than that of the full-scale sensor. In this instance, the trigger VSoC and the illustrative system and method operating thereon acts as a peripheral of the overall vision system for ID decoding or other operations and the image stream used to perform decoding is transmitted from another pixel array source.

Figure 11:
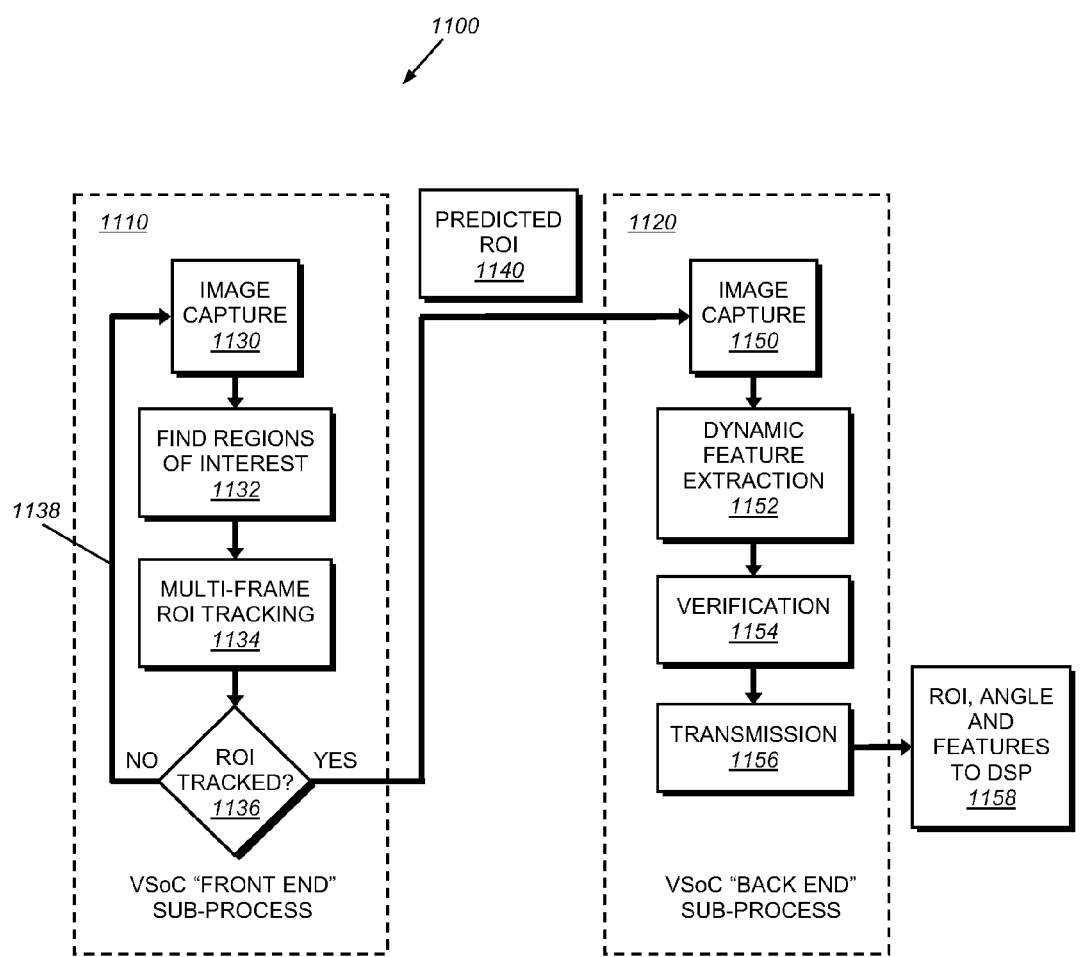
FIG. 11 is a flow diagram showing the VSoC process including an ID region of interest (ROI) predicting front end (FE) process and an optional feature-transmitting back end (BE) process based upon the predicted ROI according to an illustrative embodiment.

Reference is first made to FIG. 11, which shows a the VSoC process 1100 for capturing images, determining ROIs therein and extracting potential candidate ID features for decoding by the DSP 980 according to an illustrative embodiments. In order to most efficiently employ the parallel architecture of the LAP 425 and the reduced size of the image data memory 414 (which is generally smaller in storage capacity than the size of a fully captured image from pixel array 208), the process 1100 is divided into two parts, a "front end" (FE) sub-process 1110 and an optional (see alternatively FIG. 17 below) "back end" (BE) sub-process 1120. An image is captured and simultaneously processed using the FE algorithm. In summary, the FE process 1110 determines if an ROI is found for which features should be extracted. Typically, the only data saved in this step is the predicted location of the ROI(s) potentially containing the ID, if one or more is/are detected. If an ROI is detected, a subsequent new image is captured and simultaneously processed using the BE process 1120. The BE process 1120 executes on a predicted ROI location in the new image.

With further reference to the FE process 1110, the pixel array 208 initially captures an image of the scene containing at least one ID in step 1130. The image is read out by the read-out circuitry, row-by-row to the LAP 425. As it is read out, each row is stored in the image data memory 414 and operated upon by the LAP under the control of the CPU processor 501. The initial goal is to attempt to locate an ROI in an ROI finding step 1132 based upon ID-like features (edges) contained in the row(s). More particularly, the goal of the finding step is to locate dense regions of similarly oriented edges that meet the subject ID (e.g. a 1D barcode) size constraints. The rotation angle of the scanning appliance's pixel array 208 with respect to the ID is likely not orthogonal, so only a portion of the ID may occur in a given row. Thus, the output of several rows may be needed to detect an ROI with an ID-like feature set.

Figure 12:
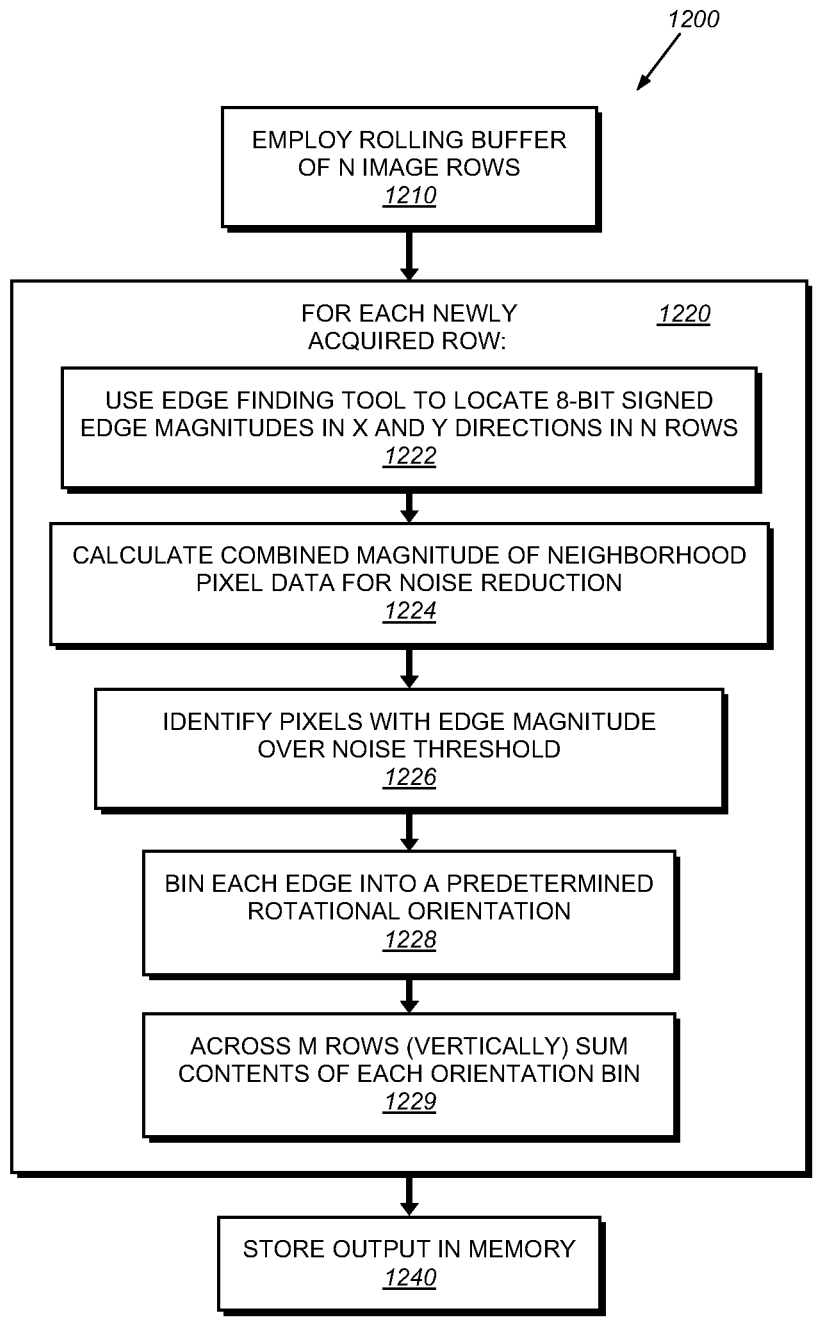
FIG. 12 is a flow diagram detailing a row-processing steps occurring during image pixel readout in an ROI-finding process according to the FE process of FIG. 11.
Figure 13:
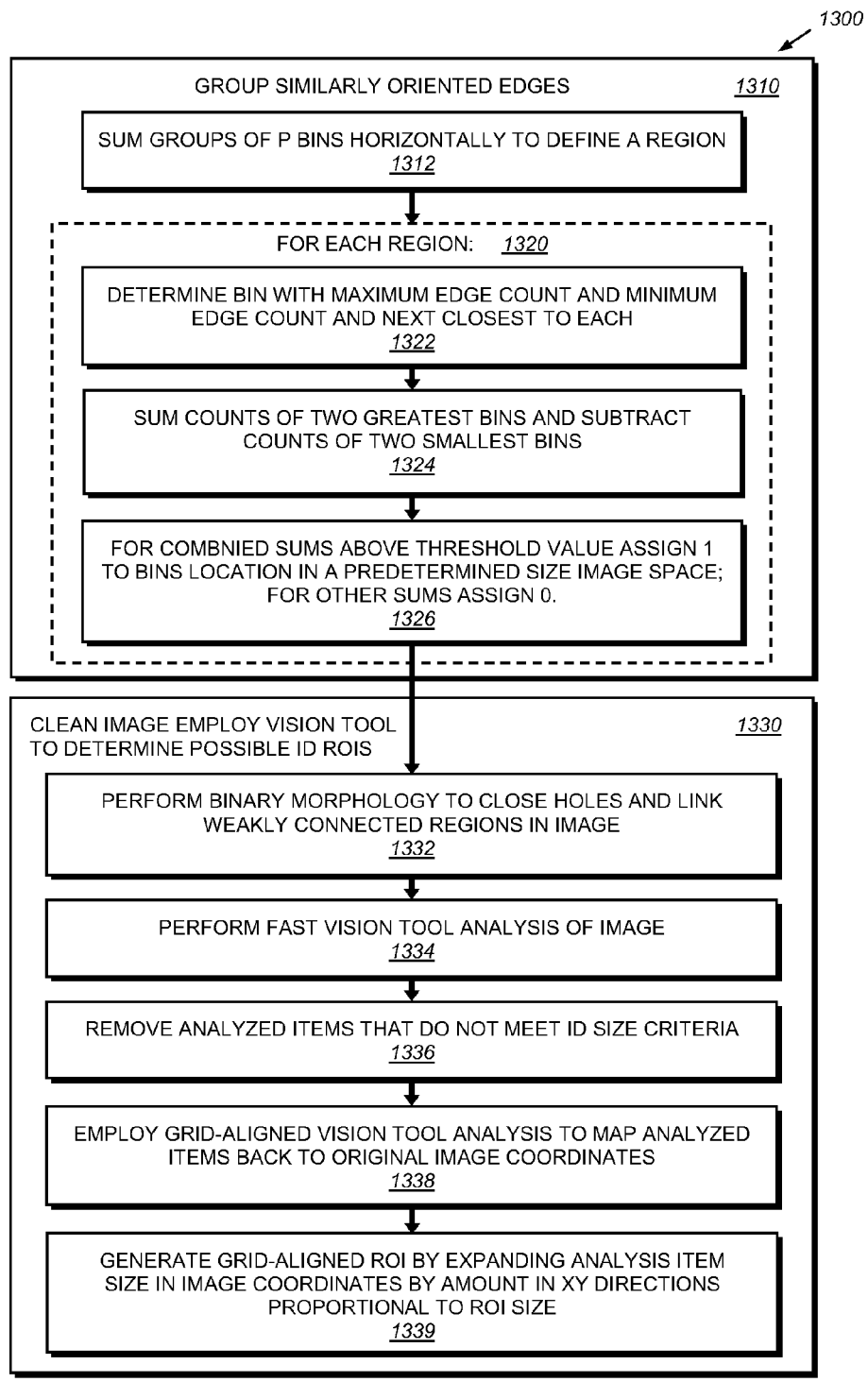
FIG. 13 is a flow diagram detailing a image-processing steps occurring subsequent to image pixel readout in an ROI-finding process according to the FE process of FIG. 11.

With further reference to FIGS. 12 and 13, the ROI-finding step 1132 is illustratively divided into two stages: (a) row-processing steps 1200 (FIG. 12) that occur during image readout and (b) image-processing steps 1300 (FIG. 13) that occur after image frame pixel readout is completed. Note that the described ordering of steps described herein (row-processing, followed by image-processing, and the individual sub-steps within each) should be taken as illustrative of a variety of possible contemplated orderings of process steps and sub-steps. The depicted/described ordering is desirable to facilitate efficiency in the execution of the ROI-finding algorithm in the illustrative embodiment. However, in alternate embodiments, some of the described row-processing sub-steps can be made part of image-processing and vice versa. More generally, the steps and sub-steps described with respect to the various processes herein can be reordered where appropriate to accommodate a particular processor and/or algorithm's requirements.

The row-processing steps 1200 are employed to locate potential ID edges and bin these based on rotational orientation. As shown in step 1210, the process 1200 defines a rolling buffer within the memory 414 that stores N image rows (step 1210). In this example N is equal to 3 rows. Next, according to row-processing step 1220, after each new row is acquired, the process employs an appropriate edge-finding tool, such as a 3×3 Sobel operator to find 8-bit signed edge magnitudes in the X and Y directions (Sx, Sy). A combined magnitude is then calculated as Sm=abs(Sx)+abs(Sy). This provides a mechanism to eliminate areas that do not afford sufficient edge-like characteristics to be considered as potential texture for an ID. This elimination of "noise" areas occurs in step 1224. Next, row-processing step 1220 of process 1200 determines those pixels that have an edge magnitude above a given noise threshold (step 1226). In an illustrative embodiment a value of 25 is used as the noise threshold. In alternate embodiments, a lower threshold can be used to allow for greater sensitivity to edge data (with less resistance to noise). It is contemplated that other mechanisms can be applied, such as measuring local contrast for setting a local edge magnitude threshold. Next, each edge is placed into a corresponding bin representing one of four (or another number) rotational orientations (step 1228). In the case of four separate bins, each represents a 45-degree range over a 180-degree arc. Next, across M rows (i.e. vertically), step 1229 sums the contents of each orientation bin vertically. In this embodiment M is equal to 16 rows, but other values are contemplated. Each bin now represents the count of edges of a particular orientation that are present in 16 rows of the image at a particular column location. The output bins of step 1220 are stored in 1024 (columns)×4 (orientations)×48 (total rows/rows combined per bin) bins, with 5 bits of data per bin in step 1240. It is contemplated that the Sobel computation (step 1222) could be reduced from the currently employed 8-bits to 6-bits, or even fewer bits, in alternate embodiments.

Next in the ROI-finding step 1132, following the completion of image pixel readout, the image processing steps 1300 (FIG. 13) are executed on the output bins. The steps 1300 consist of two parts. In the first part 1310, similarly oriented edges of potential IDs are grouped so as to form a reduced resolution binary image. Then in the second part 1330, the process employs a vision tool (illustratively a conventional blob analysis tool) to determine possible ID ROIs.

With reference to the first part 1310 of the image processing steps 1300, groups of P bins are summed horizontally in step (1312). In an illustrative embodiment the number of summed bins P is 16. The number P is variable in alternate embodiments. After summing the exemplary 16 bins, each bin now contains the count of like-oriented edges for a 16×16 image tile. In other words, for every 16×16 region of the image, there exist four bins, each with a count of the number of edges with that bin's orientation. Next, the following steps (box 1320) occur for each 16×16 region summed from step 1312. First, in step 1322, for each region, the process 1300 determines the constituent bin with the maximum edge count ("max bin") as well as the bin with the second largest edge count ("next to max bin"), the bin with the smallest edge count ("min bin"), and the bin with the next to smallest edge count ("next to min bin"). Next, for each region, the edge counts of the two greatest-edge-count bins are summed and the counts of the two smallest-edge-count bins are subtracted therefrom in step 1324. Then, for each region, for combined edge count sums (from step 1324) above a predetermined threshold value, the process assigns "1" (or another indicia) to the bin's location in a 64×48 binary image (or another predetermined size) in step 1326. This "1" value indicates that there are sufficient similarly oriented edges in that tile. Otherwise, the step assigns "0" or another indicia to the location. The result is that a predominant orientation for the particular region is achieved. It is expressly contemplated that a variety of alternate processes can be employed to provide estimates of the predominate orientation in a region and a value that corresponds to the associated magnitude of that predominant orientation.

After performing the first part 1310 of the image processing steps 1300, the process 1300 performs the second part 1330 in which the overall image is cleaned and a conventional blob analysis, or other appropriate vision tool, is employed to determine possible ID ROIs. First, the process' second part 1330 performs binary morphology (which, in this embodiment, comprises the performance of two dilations of the image and one erosion of the image using conventional image-processing techniques) to close holes and link weakly connected regions due to wide spaces between ID bars/features (step 1332). Once the image is cleaned, the process performs a fast blob analysis in step 1334. The result of the fast blob analysis (or that of another appropriate vision tool) is used to remove blobs that do not meet predetermined size criteria for known ID (step 1336). In an illustrative embodiment, the current criteria include a blob having: (a) a size>45 pixels (in which each pixel represents a 16×16 region); (b) a width>2 pixels; and (c) a height>2 pixels.

After removing blobs that fail to meet ID size criteria in step 1338, the illustrative process part 1330 employs a grid-aligned blob rectangle to map the blob position back to the original image coordinates in step 1338. Alternatively, a non-grid-aligned rectangle (or other known boundary shape) can be employed in alternate embodiments. Finally in step 1339, the process' second part 1330 generates a grid-aligned (or appropriate, non-grid-aligned) ROI by expanding the blob size in image coordinates by an amount in X and Y directions that are either fixed in size, or proportional to the ROI size. This expansion ensures that the quiet (low-noise) zone of the ID has been captured, as well as stray ID components that do not exceed the bin threshold. The end result is a detected ID ROI. The processing time to generate this data is relatively small due to the efficiency of the LAP in performing neighborhood operations on row pixels.

Referring again to the FE sub-process 1110 of FIG. 11, the result of each ROI-finding step 1132 is stored in the memory 414. When one or more ROI results are available, the FE sub-process 1110 engages in a multi-frame ROI tracking/prediction step 1134. The ROI tracking step 1134, in an embodiment, assumes that there is one candidate ROI in the image, and uses that ROI's center in succession of stored images to estimate direction, speed and acceleration of the ROI as a result of the scanning appliance/pixel array 208 being moved with respect to the ID, or vice versa—or both the ID and pixel array 208 being moved with respect to each other. For IDs moving at 30 inches per second, the magnitude of position change is fairly small per frame, assuming an effective frame rate of approximately 150-200 processed frames per second. The tracking process is operates relatively quickly, comparing the change in location of the center of the ROI between frames with respect to its position in the field of view (which can be represented by the overall pixel array or a subset thereof). Note that in alternate embodiments ROI tracking can be employed where there exists more than one ROI candidates in an image, with appropriate mechanisms to distinguish and track each ROI separately. For example, where each ROI moves a similarly small amount between frames, it is assumed that the new position for each ROI is associated with that ROI and not another. More generally, tracking of one or more ROIs entails a decision as to whether the candidate ROI in each image frame has moved consistently in terms of distance and direction relative to a previous location (e.g. within a given range of acceptable motion constraints). Large distance or directional discontinuities for a candidate ROI in a given frame or frames with respect to other frames can be discarded from the tracking calculation. Likewise, lack of a consistent expected track for candidate ROI between frames indicates a false reading.

A decision step 1136 determines when a sufficient number of reliable tracking events have occurred and branches back (via branch 1138) to step 1130 until a sufficient number of reliable tracking events are stored to ensure proper tracking of a potential ID ROI. When a sufficient number of ROI frames have been tracked to reliably confirm that an ROI is most likely the subject of the tracking process (e.g. the ROI remains predictably present in most or all of the succession of processed image frames, and has moved in a fashion consistent with the range of acceptable motion constraints), then the decision step 1136 branches to the BE sub-process 1120, delivering the parameters of the predicted ROI 1140 from memory 414. Other data related to the FE sub-process is no longer necessary and can be overwritten in memory 414.

In the optional BE sub-process 1120, the pixel array 208 carries out further image capture in step 1150. Illustratively, the capture and readout can occur only in the area of the array associated with the predicted ROI (taking into account its predicted current position within the array's overall pixel field). The pixel data that is read-out from the image capture (step 1150) is then subjected to the further data refinement brought about by dynamic feature extraction in step 1152. Dynamic feature extraction is used to more-accurately determine the relative angle and spacing of ID features (within the predicted ROI) with respect to each other so that the chance of a false ID reading is reduced. This process also reduces the processing overhead on the off-chip decoding circuit (DSP 980) by performing that portion of ID reading that is more efficiently accomplished by the LAP. In general, the generation of a predicted ROI during the LAP-efficient FE sub-process ensures that fewer false-positive ID detection events occur at the more processing intensive feature extraction or decoding steps. Rather, a significant number (or all) false-positives are disposed of during the rapid FE sub-process.

Dynamic feature extraction is based upon the computation of edge magnitude features within the predicted ROI. In an illustrative embodiment, it employs either a 3×3 or 5×5 kernel based on the size of the predicted ROI delivered from the FE sub-process 1110. A larger kernel (5×5, for example) can be employed for larger predicted ROIs to obtain better angular/rotational resolution of the feature edges. Dynamic feature extraction is performed as row-processing operation and occurs as the image is read out from the pixel array 208.

For a smaller 3×3 kernel, the Sobel operator is used. For a 5×5 kernel, a separable filter function, which approximates a derivative of a Gaussian, can be employed. In an illustrative embodiment, this kernel is optimized for power-of-two computations and has the following elements: g=[1 4 8 4 1] and gp=[1 2 0 −2 −1]. To measure the X response of the filter, the image is convolved with $g^T$ and then with gp. To measure the Y response of the filter, the image is convolved with $gp^T$ and then with g. The resulting signed X and Y edge magnitudes are then truncated (if desired), concatenated, and saved in memory 414. The minimum size of the resulting edge magnitude is 4-bits for X and 4-bits for Y (3 magnitude bits+1 sign bit), yielding an 8-bit value per pixel. However, if desired, this can be increased to any bit depth desired up to 8-bits for each X and Y magnitude components, yielding a 16-bit value per pixel. The following table details an exemplary relationship between ID (a UPC-A barcode) size, the filter used, and memory requirements. As evident from the table below, processing of dynamic feature extraction is rapid. The depicted storage requirements for memory assumes a worst-case, where the barcode is oriented vertically—generally requiring features to be determined on a largely or entirely column by column basis. As shown, storage in excess of 8-bit data can exceed the illustrative available memory for nominal barcodes at the minimum imaging distance (e.g. 376×241 pixels).

| Barcode Size (pixels) | Filter Used | Row Processing - Time per Row (uSecs) | Worst Case Total Time (mSecs) | 8-bit Storage (data rows) | 12-bit Storage (data rows) | 16-bit Storage (data rows) |
|---|---|---|---|---|---|---|
| 150 × 104 | 3 × 3 | 3.8 | 0.6 | 1200 | 1800 | 2400 |
| 150 × 104 | 5 × 5 | 12 | 1.8 | 1200 | 1800 | 2400 |
| 215 × 149 | 3 × 3 | 3.8 | 0.8 | 1720 | 2580 | 3440 |
| 215 × 149 | 5 × 5 | 12 | 2.6 | 1720 | 2580 | 3440 |
| 376 × 241 | 3 × 3 | 3.8 | 1.4 | 3008 | 4512 | 6016 |
| 376 × 241 | 5 × 5 | 12 | 4.5 | 3008 | 4512 | 6016 |

Following the extraction of dynamic features, the BE sub-process implements an ID verification step 1154 that accomplishes at least three goals. That is, verification checks the ROI to increase the confidence that it contains a barcode by more finely examining the histogram of edge angles at multiple places in the ROI. This allows for angular distortion and contrast difference across the imaged ID. The verification step also determines the dominant angle of the ID features (e.g. parallel barcode bars), and determines a set of scan-line end-points from which an oriented ROI may be obtained. More generally, verification applies a more-constrained range of orientation angles to the features to ensure accurate alignment of the ID features (parallel bars, for example) with respect to each other.

ID verification is an image processing operation that occurs after image readout is completed. However, during readout, the verification process stores equally-spaced horizontal "stripes" or "scan lines" of the predicted ROI in memory 414 so that verification processing can be performed subsequently. In an illustrative embodiment, the number of stripes stored is currently set to 7, but a larger or smaller number can be employed in alternate embodiment. The width of each stripe is either 3 rows or 5 rows, depending on the size of the ROI. In an embodiment, larger-size ROIs typically employ the wider stripes so that a larger filter can be applied.

Figure 14:
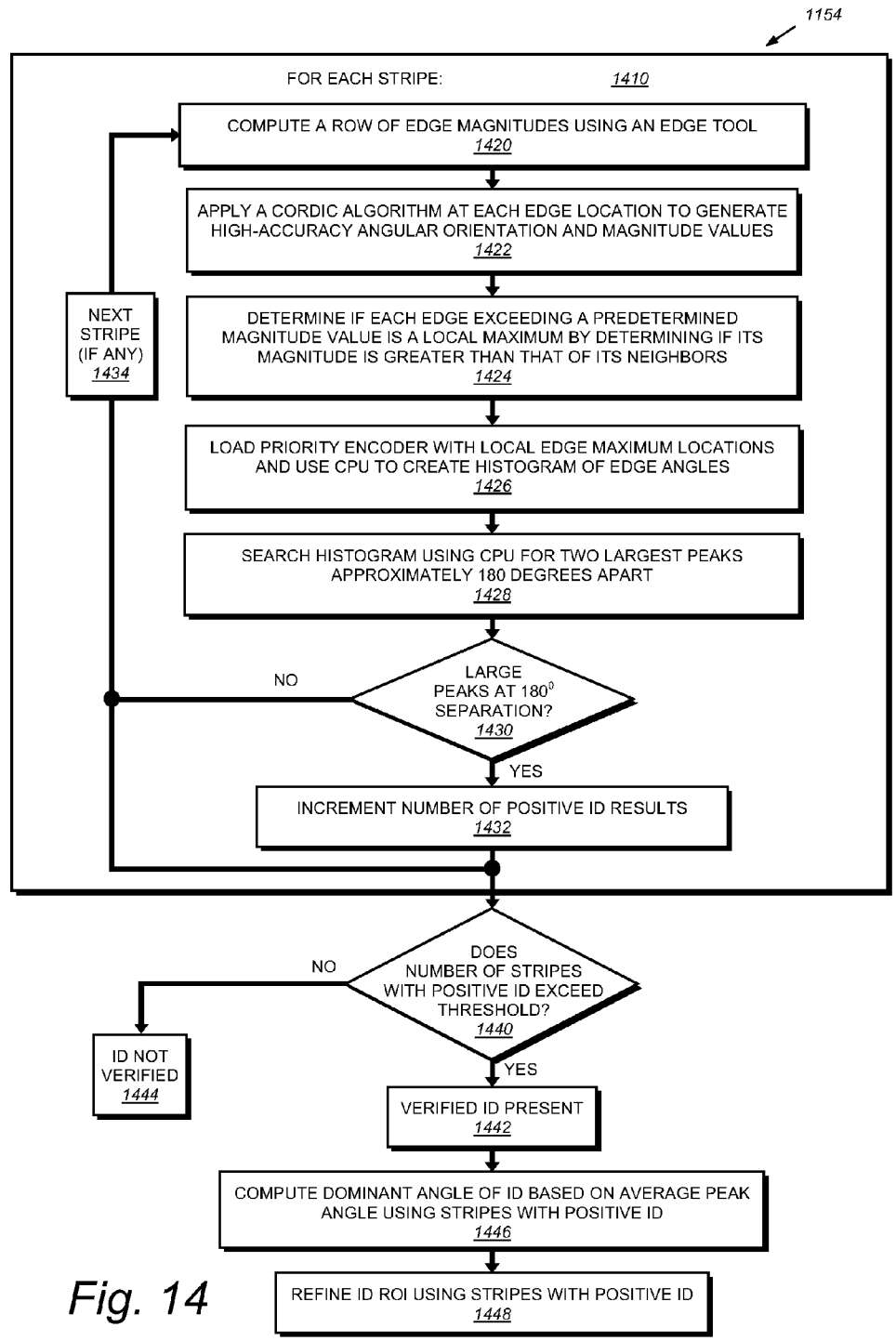
FIG. 14 is a flow diagram detailing an ID feature verification process according to the optional BE process of FIG. 11.

With reference to FIG. 14, the verification process 1154 causes, for each stripe (block 1410) computation of a row of edge magnitudes using either the 3×3 Sobel algorithm or the 5×5 separable, power-of-two filter (or another edge tool) in step 1420. In various embodiments, these magnitudes can be pre-computed during dynamic feature extraction (step 1152) if the tools/filters employed are the same in both steps 1152 and 1154. In the illustrative embodiment each edge magnitude is defined by two signed 8-bit components representing the X and Y edge directions. Next, a Cordic (or other appropriate) algorithm is run on the LAP 425 at each edge location to generate a 9-bit angle and 9-bit magnitude values (step 1422). Note that a Cordic function is employed in the embodiment because it allows for the computation of angles free of trigonometric functions (e.g. the tangent/arctangent function), which can pose a burden to processor overhead and operational speed.

For each edge location that exceeds a given magnitude, the verification process 1154 then determines if it is a local maximum by determining if it has greater magnitude than its left and right neighbors (step 1424). Next, the VSoC priority encoder 956 is loaded with the local edge maximum locations from step 1424, and the CPU (RISC) processor 501 is employed to create a histogram of edge angles based on these locations (step 1426). Using the CPU 501, the histogram is searched for the two largest peaks approximately 180 degrees apart (step 1428). If large peaks can be found with 180 degree angular separation, then this stripe indicates that an ID is present (decision step 1430) and the number of positive ID results is incremented (step 1432). The next stripe (step 1434), if any, is selected and the process branches back to the computation step 1420 operating on this next stripe. Likewise, if the stripe is not a positive ID (decision step 1430) the process operates on the next stripe (if any) via steps 1434 and 1420. When all stripes are processed, decision step 1440 determines if the number of stripes that indicate the positive presence of an ID exceeds a threshold. If so, then the ID is verified (step 1442). Otherwise the decision step 1440 returns a not-verified result (step 1444) and the system either searches for a new ROI or returns a no-read indication to the user—prompting him or her to rescan the subject.

It is contemplated that additional checks and tests can be performed on each angle histogram or across angle histograms in alternate embodiments as the processing overhead is reasonably low in such operations. The verification process 1154 can further include computing the dominant ID angle in step 1446 using those stripes that indicate a barcode is present. The dominant barcode angle is defined in illustrative embodiments the average peak angle (between 0-180 degrees) of those stripes. The barcode ROI can then be refined by using the same stripes (step 1448). The beginning and end edges of each stripe that are within a set tolerance of the dominant ID angle are found. The boundaries of the ROI can be more tightly refined and oriented along the dominant angle using these sampled points. Note that alternate algorithms/processes can be employed on the VSoC CPU 501 using this rich edge data to determine the beginning and end of the ID for each stripe, and the majority of such processes should have minimal impact on the overall processing time.

In the illustrative embodiment, the successfully extracted and verified features, as well as the ROI information and dominant angle (1158) are then forwarded over the host port 962 or another communication link (e.g. LVDS 974) to the off-chip DSP 980 for decoding of the information contained in the ID in accordance with step 1156. The transmitted features typically embody the entire ID or a significant portion thereof. Because of this, a large set of features may be problematic to transmit in a timely manner to the DSP. In one embodiment the CPU sends the transmission in 16-bit units to the host port. In an illustrative embodiment, and with reference to FIG. 9, the VSoC can include a shift register 996 having a 1024-wide storage array and an interconnection to the 1024-wide bus to more-efficiently transmit data to the DSP. As such, the LAP 425, rather than the CPU 501, can direct the transfer of a 1024-wide row from memory 414 to the shift register 996, and then out to a selected port via (for example) the bus 966. This essentially frees the CPU and other components from performing an otherwise time-consuming transmission of data through the port, which can now be handled at a high clock rate by the shift register 996 while the processors 425, 501 operate on other tasks.

Figure 15:
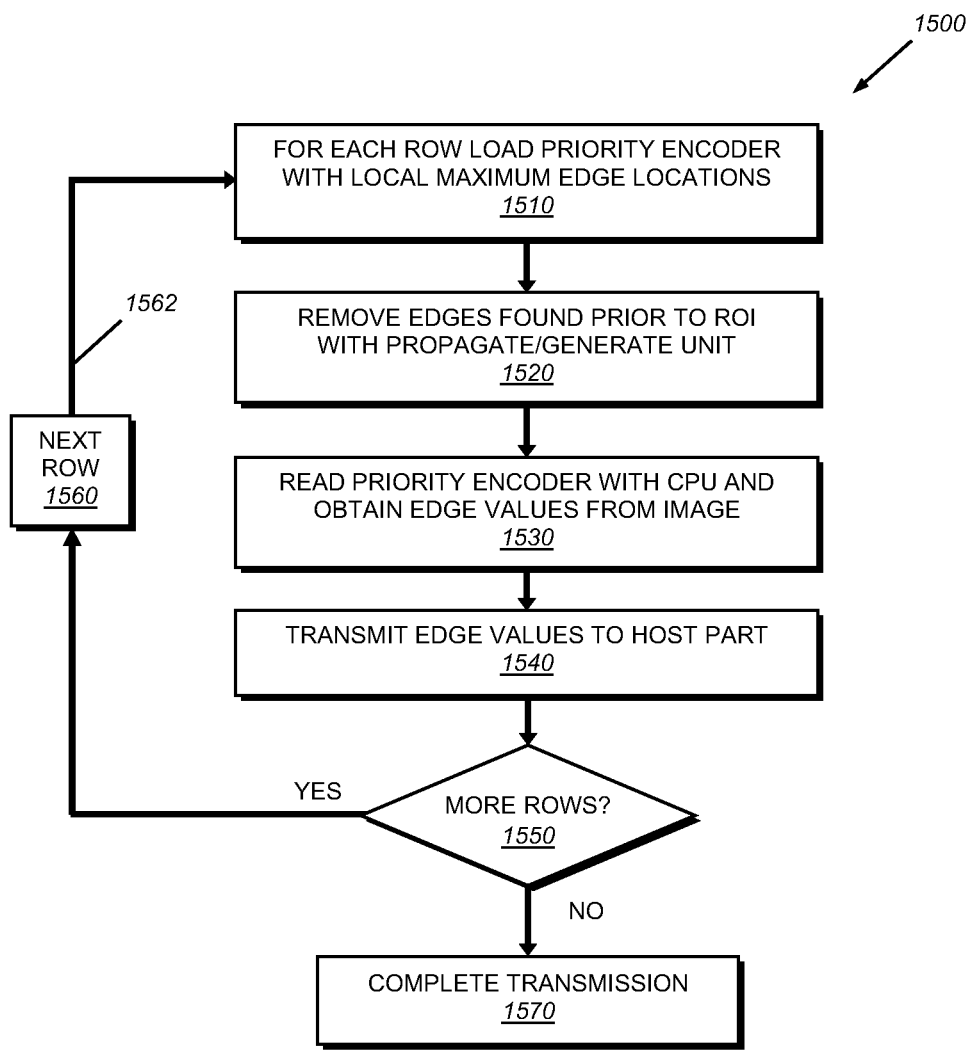
FIG. 15 is a flow diagram of an exemplary process for compressing or encoding feature data prior to transmission to the ID decoder or other device in the BE process of FIG. 11 according to an illustrative embodiment.

In a further illustrative embodiment it is contemplated that the transmission step can include the encoding to compress the data stream transmitted to the DSP. In an illustrative embodiment a run-length encoding process 1500 can be implemented as shown in FIG. 15. In step 1510, the process 1500 acts upon each row by first loading the priority encoder 956 with local maximum edge locations (derived, for example from the feature extraction 1152 and/or verification step 1154 above). Edges found prior to the ROI are removed using the propagate/generate unit 958 in step 1520. The CPU 501 then reads the priority encoder 956 to obtain edge values from the image in step 1540. The process continues while rows are present (decision step 1550) operating on each next row (step 1560 and branch 1562 to step 1510. When all rows have been processed (decision step 1550) the compressed transmission is complete (step 1570), removing unneeded information in the image appearing before the ROI. It should be clear that more complex and/or alternate compression or encoding techniques can be employed in alternate embodiments.

Figure 16:
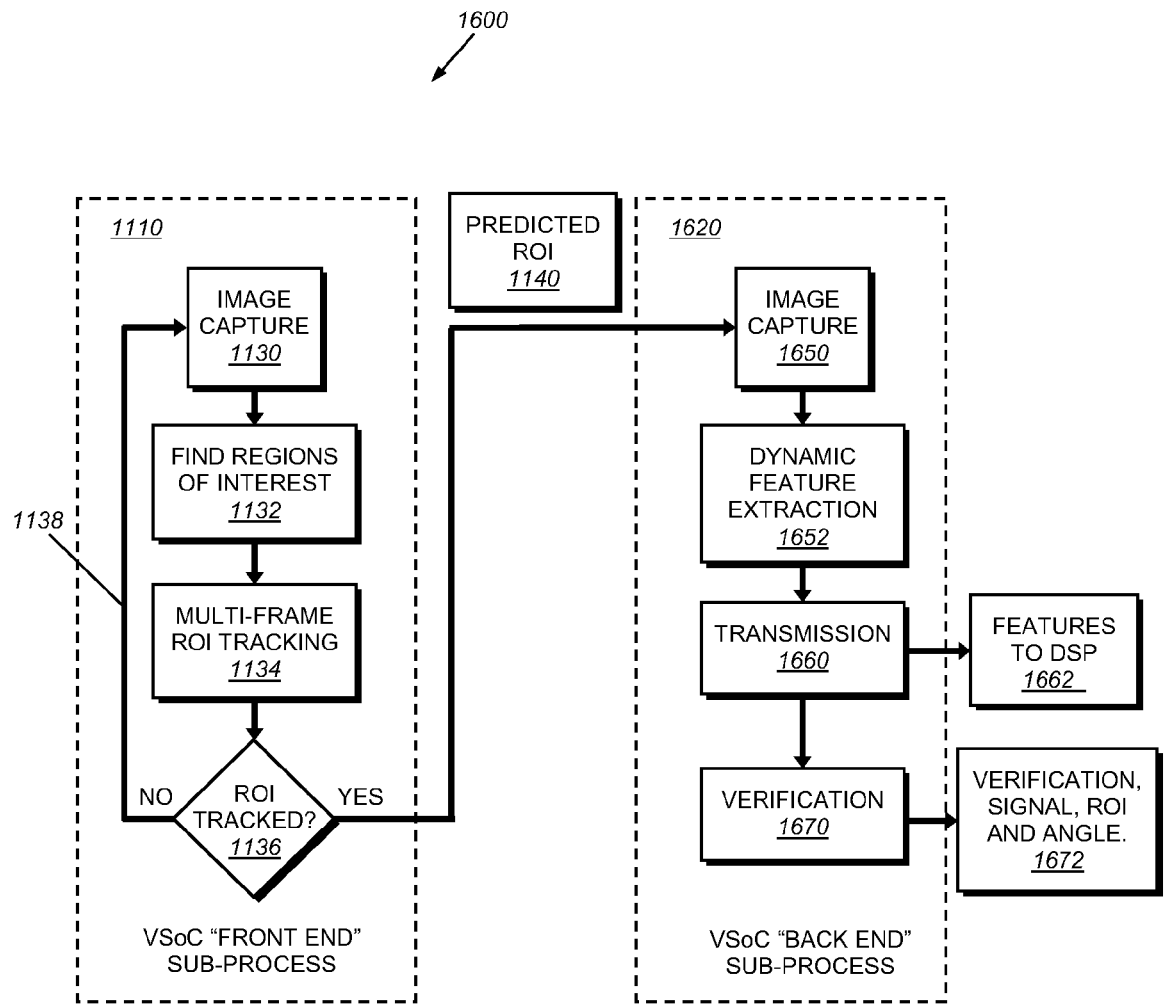
FIG. 16 is a flow diagram showing the VSoC process including an FE process similar to that of FIG. 11 and a BE process in which features are transmitted to the ID decoder or other device prior to the verification process according to an alternate embodiment.

Memory limitations can burden appropriate storage of features in various embodiments. Accordingly FIG. 16 details an alternate embodiment for a VSoC process that reduces memory burdens result in an on-average lower frame rate and increased data transmission. In general, the FE process 1110 of FIG. 16 is substantially the same as that described with reference to FIG. 11, and thus, like reference numbers are employed. Following delivery of the predicted ROI 1140 to the BE process 1620 of FIG. 16. As shown, capture and readout occur at step 1650 in the BE process 1620. Dynamic feature extraction (step 1652) and transmission (step 1660) occur during image readout for all predicted ROIs (1140). Accordingly, the decoding DSP receives feature data 1662 during readout before verification has occurred. In this embodiment, ID verification (step 1670) occurs after readout and Transmission are complete. A verification signal, along with the dominant angle and refined ROI position information 1672 (assuming the ID is verified) is sent at the end of the cycle from which the DSP can complete the decoding process. Alternatively, if the ID cannot be verified, then the DSP either receives a non-verification signal, or no signal (thereby timing-out), and does not decode the ID. Note that the on-average lower frame rate in accordance with the BE process 1620 results because the refined ROI (i.e. a bounding box that is aligned with the dominant angle of the ID) is not calculated prior to feature transmission. Therefore, all features of the predicted grid-aligned ROI, which is on-average larger than the refined ROI, are transmitted to the DSP. Increased data transmission is due to this larger ROI and because features are transmitted for every candidate ROI since verification occurs after transmission. Verification typically does not occur during readout because it can significantly impact the row readout time.

Figure 17:
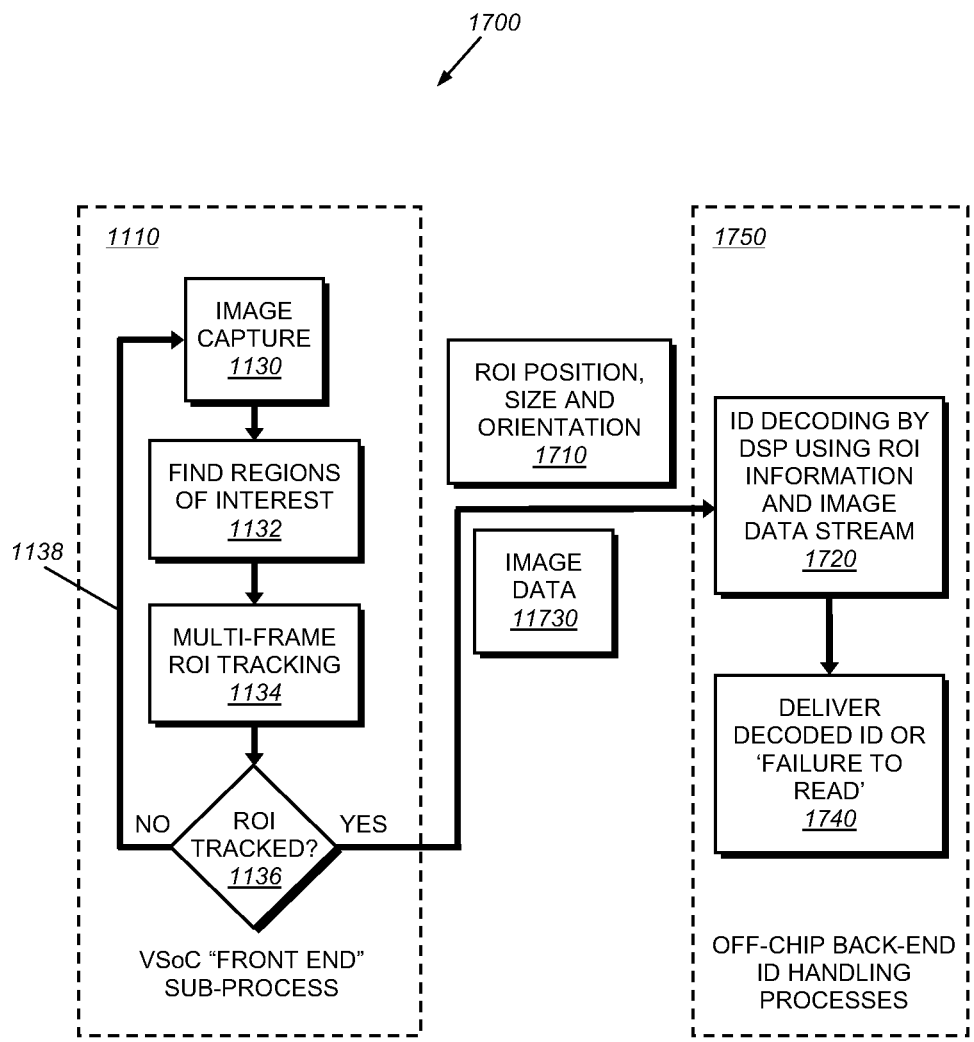
FIG. 17 is a flow diagram showing the VSoC process including an ROI-predicting FE process that delivers appropriate ROI information and image data directly to a back-end processor that decodes the information according to an alternate embodiment, which is free of the feature-transmitting BE process of FIG. 11.

As described above, the full FE/BE process 1100 and 1600 (FIGS. 11 and 16) is one of a variety of possible data funneling processes that can be implemented in accordance with the ID-detecting and determining system and method in accordance with illustrative embodiments. As shown in FIG. 17, a VSoC process 1700 that employees the equivalent FE process 1110 generates ROI position, size and orientation data 1710. Instead of further refining this data through feature extraction and verification in a BE process, the information is directly transmitted to an off-chip back-end decoding device (part of process 1750), such as a decoding DSP 1720, with an appropriate conventional or custom decoding application adapted to employ the transmitted ROI information. The system also transmits either a raw, reduced or compressed image data stream 1730 to the decoding device 1720. This stream is acted upon by the decoding device, under general control of the ROI parameters in an attempt to uncover the underlying ID code (if any). That is, the decoder 1720 employs the ROI information to trigger a scan of the incoming image data and attempt to locate and align the search for decodable ID features (using conventional techniques) with respect to the location and orientation of the ROI within the image. Based upon this, the decoding device either returns the decoded ID (or a plurality of IDs) or indicates a failure to read a full ID if unsuccessful (block 1740).

Figure 18:
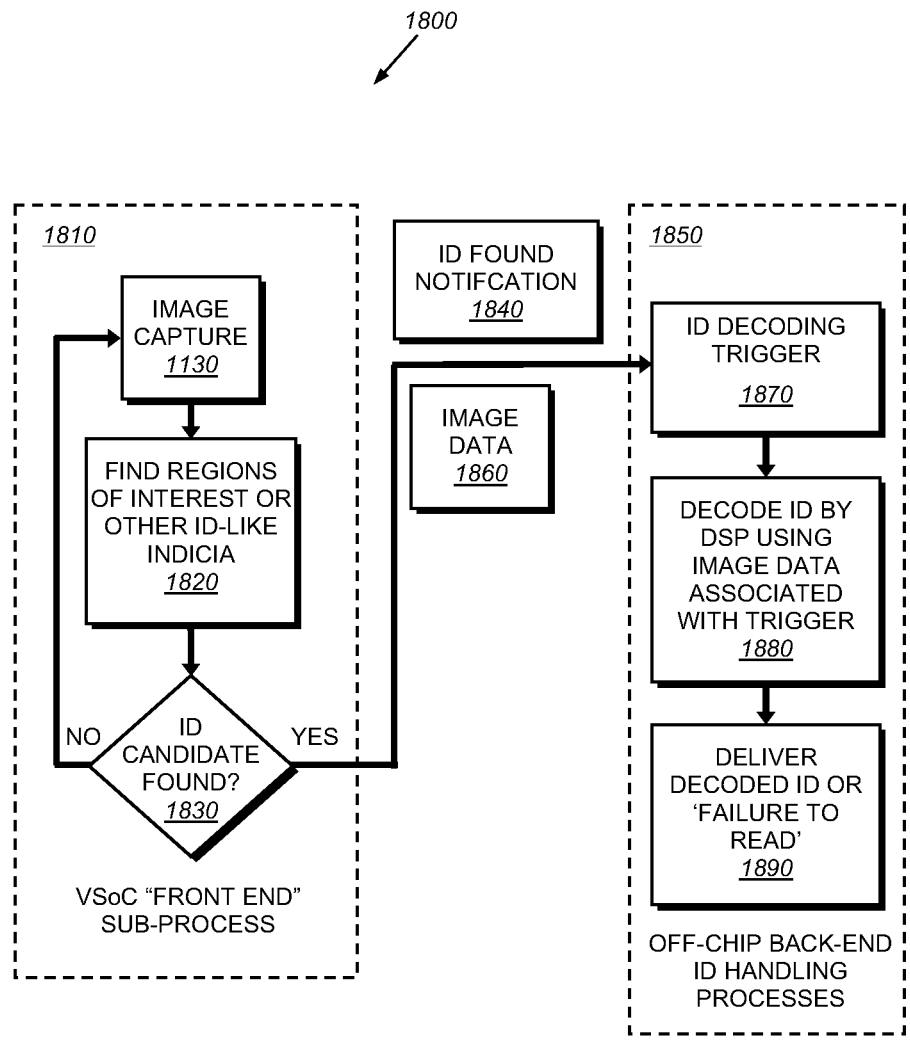
FIG. 18 is a flow diagram showing the VSoC process including an ID candidate notification process that triggers a back-end processor to search for and decode any ID features within the associated image data stream according to an alternate embodiment.

The efficiency of the data funneling characteristics of the VSoC process still apply even in an implementation where the majority of ID detection and decoding is carried out on a back-end, potentially off-chip, (DSP) processor. As shown in FIG. 18, the overall process 1800 undertakes an image capture process 1130, similar to that described above as part of a more truncated VSoC process 1810. The LAP or other VSoC processing elements conduct a fast ROI-finding operation similar to that described above, or another fast ID-detect algorithm using, for example neighborhood operations, in step 1820. After finding and ROI or other ID indicia (decision step 1830), the VSoC process 1810 transmits a notification 1840 to the (typically) off-chip back-end ID handling process 1850, along with the associated, contemporaneous stream of image data 1860, either in raw form, or with appropriate compression. The notification serves as an ID-decoding trigger 1870 for the ID decoding processor (DSP with conventional or custom decoding application). This trigger instructs the DSP to search the stream 1860 for ID-like image data, and if possible, to decode the located information (step 1880), if any. The decoded information is delivered in step 1890 if decoding is successful. Otherwise a failure to decode notification is provided. In an embodiment, the notification can include information as to where in the image the trigger was generated so that the each for information in the DSP can be accurately timed begin search in the likely portion of the streamed image data that caused the trigger.

It should be clear that the various VSoC processes described above can provide a variety of image information that is initially large-scale (derived from image capture), and that is then condensed by efficient large-scale (typically parallel) processes and associated algorithms to provide a smaller useful data set that can be processed efficiently by other processes, processor and/or algorithms and processes while the large-scale process continue.

More generally, it should be clear that the illustrative system and method efficiently employs the features of the exemplary VSoC to desirably handle a large volume of front-end high-speed image data so as to effectively funnel this information into a smaller stream of useful data that is delivered in a contemporaneous manner to a back-end processor and/or process. By taking full advantage of the parallel aspects of the LAP for rough image processing during readout and performing finer image processing on a more compact data set after processing using a combination of the LAP and CPU, the frame rate can effectively multiplied by three or more in various implementations relative to a more conventional ID decoding arrangement. In addition, the reduction in computational overhead and simplification of the image processing architecture using the LAP architecture reduces overall power consumption, allowing for a wireless scanner to enjoy an increased operational cycle between rechargings or battery replacement.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, in alternate embodiments, the decoding function and circuitry can be provided on-chip and interconnected with the other functional component of a VSoC via appropriate on-chip communication links and/or busses. Likewise, the width of data rows and columns provided in the pixel array and implemented in processor, memory and communication bus interconnections is highly variable. More generally, the system and method described herein can be implemented in hardware, software consisting of computer-readable program instructions or a combination of hardware and software. Accordingly, this description is meant to be taken only by way of example, and not to otherwise limit the scope of this invention.

What is claimed is:

1. A system for detecting and extracting symbology ID features comprising:
   a. a plurality of single-instruction, multiple-data (SIMD) processors, a memory, and at least one general purpose processor all residing on a discrete die, the memory being constructed and arranged to store and transfer, and the SIMD processors each being constructed and arranged to operate on, a group of pixel data provided by a pixel array; and
   b. an ID region of interest (ROI) finding process that detects at least one ID ROI that contain ID characteristics and that operates at least in part while captured pixel data associated with the ID ROI is provided from the pixel array so as to provide a data set that is transmitted to an ID decoding process; wherein the ROI-finding process includes a row-processing process that operates within a row to detect edge data indicating an ID ROI candidate while captured pixel data is read-out from the pixel array.

2. The system as set forth in claim 1 wherein the pixel array is on the die.

3. The system as set forth in claim 1 wherein each of the SIMD processors is constructed and arranged to operate on the group of pixel data provided by the pixel array on a common clock cycle.

4. The system as set forth in claim 1 wherein the group of pixel data comprises a row of pixel data read-out from the pixel array.

5. The system as set forth in claim 1 wherein the ROI-finding process includes an image-processing process that operates to group each ID ROI candidate edge data into similar bins relative to orientations thereof.

6. The system as set forth in claim 5 wherein the image-processing process defines bins with maximum count of edge data therein.

7. The system as set forth in claim 5 wherein the image-processing process includes a blob analysis process that analyzes for edge data meeting ID size criteria and a process that generates at least one ROI based upon a mapping of analyzed ROI data that meets the ID size criteria.

8. The system as set forth in claim 1 further comprising an ROI tracking process that employs at least one ROI to define ROI motion characteristics so as to provide a predicted ROI.

9. The system as set forth in claim 8 further comprising a data refinement process that receives the predicted ROI and, based upon the predicted ROI and subsequent image capture, generates ID features within the ROI for decoding of information therein.

10. The system as set forth in claim 9 wherein the data refinement process further includes verification of ID information within the ID features, including further refinement of an angular orientation of the ID features.

11. A system for detecting and extracting symbology ID features comprising:
   a. a plurality of single-instruction, multiple-data (SIMD) processors, a memory, and at least one general purpose processor all residing on a discrete die, the memory being constructed and arranged to store and transfer, and the SIMD processors each being constructed and arranged to operate on, a group of pixel data provided by a pixel array;
   b. a front end (FE) process that determines a presence of ID characteristics within a grouping of pixel data while the pixel data is being captured and read from the pixel array, wherein the FE process includes an image-processing process that operates to group each ID ROI candidate edge data into similar bins relative to orientations of the ID ROI candidate edge data with respect to the pixel array; and
   c. a transmission process that forwards information associated with the presence of the ID characteristics so as to allow a decoding process to decode at least a portion of the pixel data to derive ID information therefrom.

12. The system as set forth in claim 11 wherein pixel array is on the die.

13. The system as set forth in claim 11 wherein the decoding process is located off-die and operatively connected to the die.

14. The system as set forth in claim 11 further comprising an ROI motion-determination process that derives a predicted ROI.

15. The system as set forth in claim 14 wherein the predicted ROI information is transmitted to the decoding process in association with a stream of the pixel data read from the pixel array.

16. The system as set forth in claim 11 further comprising a back end (BE) process that captures the pixel data and extracts ID features therefrom and verifies presence of the ID features based upon the predicted region of interest, the extracted ID features being transmitted to the decoding process.

17. The system as set forth in claim 11 wherein the decoding process receives the presence of the ID characteristics as a trigger and in response thereto is constructed and arranged to decode an ID from a transmitted stream of the pixel data.

18. A method for detecting and extracting symbology ID features comprising the steps of:
   a. with a plurality of single-instruction, multiple-data (SIMD) processors, a memory, and at least one general purpose processor all residing on a discrete die, storing and transferring, by the memory, a group of pixel data provided by a pixel array and operating, by at least one of the SIMD processors, on the group of pixel data; and
   b. operating an ID region of interest (ROI) finding process that detects ID ROIs that contain ID characteristics and at least in part while captured pixel data associated with the ID ROI is provided from the pixel array so as to provide a data set that is transmitted to an ID decoding process;
   c. operating a row-processing process within a row to detect edge data indicating an ID ROI candidate while captured pixel data is read-out from the pixel array.

19. The method as set forth in claim 18 further comprising locating the pixel array on the die.

20. The method as set forth in claim 18 wherein the step of operating by the at least one of the SIMD processors operates on the group of pixel data in a common clock cycle.

21. The method as set forth in claim 18 wherein the group of pixel data comprises a row of pixel data read-out from the pixel array.

22. The method as set forth in claim 18 further comprising operating an image-processing process that operates to group each ID ROI candidate edge data into similar bins relative to orientations thereof.

23. The method as set forth in claim 22 further comprising defining, in the image-processing process, bins with maximum count of edge data therein.

24. The method as set forth in claim 22 further comprising performing, in the image processing process, a blob analysis process that analyzes for edge data meeting ID size criteria and a process that generates at least one ROI based upon a mapping of analyzed ROI data that meets the ID size criteria.

25. The method as set forth in claim 18 further comprising tracking an ROI by employing at least one ROI to define ROI motion characteristics so as to provide a predicted ROI.

26. The method as set forth in claim 25 further comprising operating a data refinement process that receives the predicted ROI and, based upon the predicted ROI and subsequent image capture, generating ID features within the ROI for decoding of ID information therein.

27. The system as set forth in claim 26 further comprising verifying ID information within the ID features, including further refining of an angular orientation of the ID features.

28. A method for detecting and extracting symbology ID features comprising the steps of:
   a. with a plurality of single-instruction, multiple-data (SIMD) processors, a memory, and at least one general purpose processor all residing on a discrete die, storing and transferring, by the memory, a group of pixel data provided by a pixel array and operating, by at least one of the SIMD processors, on the group of pixel data;
   b. determining, with a front end (FE) process, a presence of ID characteristics within a grouping of pixel data while the pixel data is being captured and read from the pixel array, wherein the FE process includes an image-processing process that operates to group each ID ROI candidate edge data into similar bins relative to orientations of the ID ROI candidate edge data with respect to the pixel array; and
   c. forwarding, with a transmission process, information associated with the presence of the ID characteristics so as to allow a decoding of at least a portion of the pixel data to derive ID information therefrom.

29. The method as set forth in claim 28 further comprising locating the pixel array on the die.

30. The method as set forth in claim 28 wherein the step of decoding is performed off-die.

31. The method as set forth in claim 28 further comprising deriving a predicted ROI with an ROI motion-determination process.

32. The method as set forth in claim 31 further comprising transmitting information of the predicted ROI to the decoding process in association with a stream of the pixel data read from the pixel array.

33. The method as set forth in claim 31 further comprising capturing the pixel data with a back end (BE) and extracting ID features therefrom.

34. The method as set forth in claim 33 further comprising verifying presence of the ID features based upon the predicted region of interest, the extracted ID features being transmitted to the decoding process.

35. The system as set forth in claim 28 the step of decoding includes receiving the presence of the ID characteristics as a trigger and in response thereto decoding an ID from a transmitted stream of the pixel data.

* * * * *